(12) United States Patent
Sadasue et al.

(10) Patent No.: US 11,731,210 B2
(45) Date of Patent: Aug. 22, 2023

(54) LONG STEEL PIPE FOR REEL-LAY INSTALLATION AND METHOD FOR PRODUCING THE SAME

(71) Applicant: JFE Steel Corporation, Tokyo (JP)

(72) Inventors: Teruki Sadasue, Tokyo (JP); Tsunehisa Handa, Tokyo (JP); Yoshiaki Murakami, Tokyo (JP)

(73) Assignee: JFE STEEL CORFORATION, Tokyo (JP)

( * ) Notice: Subject to any disclaimer, the term of this patent is extended or adjusted under 35 U.S.C. 154(b) by 317 days.

(21) Appl. No.: 17/279,218

(22) PCT Filed: Sep. 24, 2019

(86) PCT No.: PCT/JP2019/037380
§ 371 (c)(1),
(2) Date: Mar. 24, 2021

(87) PCT Pub. No.: WO2020/067064
PCT Pub. Date: Apr. 2, 2020

(65) Prior Publication Data
US 2022/0032391 A1 Feb. 3, 2022

(30) Foreign Application Priority Data

Sep. 28, 2018 (JP) .................. 2018-184770
Sep. 28, 2018 (JP) .................. 2018-184771

(51) Int. Cl.
*F16L 13/02* (2006.01)
*B23K 11/093* (2006.01)
(Continued)

(52) U.S. Cl.
CPC ............ *B23K 11/0935* (2013.01); *F16L 9/02* (2013.01); *F16L 13/02* (2013.01); *B23K 2101/10* (2018.08); *B23K 2103/04* (2018.08); *F16L 9/22* (2013.01)

(58) Field of Classification Search
CPC ... F16L 9/22; F16L 13/02; F16L 1/203; F16L 1/16; B23K 1/0935; B23K 2103/04; B23K 31/02
(Continued)

(56) References Cited

U.S. PATENT DOCUMENTS

| 1,952,217 A | 3/1934 | Patton et al. |
| 5,134,267 A | 7/1992 | Atsumi et al. |

(Continued)

FOREIGN PATENT DOCUMENTS

| JP | 0337491 A | 2/1991 |
| JP | 03133576 A | 6/1991 |

(Continued)

OTHER PUBLICATIONS

Extended European Search Report for European Application No. 19864023.7, dated Nov. 4, 2021, 5 pages.

(Continued)

*Primary Examiner* — Patrick F Brinson
(74) *Attorney, Agent, or Firm* — RatnerPrestia

(57) ABSTRACT

A long steel pipe for reel-lay installation formed of electric resistance welded (ERW) steel pipes and having high buckling resistance and a method for producing the long steel pipe for reel-lay installation are provided. The long steel pipe is formed by successively butt-joining longitudinal ends of the ERW steel pipes by girth welding so that girth welds are formed. The ERW steel pipes are successively butt-joined in the pipe longitudinal direction such that the 0 o'clock cross-sectional position or the 6 o'clock cross- (Continued)

sectional position of one of adjacent ERW steel pipes faces an area from the 2 o'clock cross-sectional position to the 4 o'clock cross-sectional position or an area from the 8 o'clock cross-sectional position to the 10 o'clock cross-sectional position of the other of the adjacent ERW steel pipes.

12 Claims, 11 Drawing Sheets

(51) Int. Cl.
*F16L 9/02* (2006.01)
*B23K 103/04* (2006.01)
*B23K 101/10* (2006.01)
*F16L 9/22* (2006.01)

(58) Field of Classification Search
USPC .......................... 138/155; 242/470; 228/101
See application file for complete search history.

(56) References Cited

U.S. PATENT DOCUMENTS

| | | | |
|---|---|---|---|
| 8,323,957 B2 | 12/2012 | Yokoyama et al. | |
| 10,900,104 B2 | 1/2021 | Kami et al. | |
| 2010/0119860 A1 | 5/2010 | Hitoshi et al. | |
| 2013/0195557 A1* | 8/2013 | Bertaso | G01M 3/02 |
| | | | 29/523 |
| 2014/0290807 A1 | 10/2014 | Goto et al. | |
| 2015/0337995 A1* | 11/2015 | Pepin | F16L 9/22 |
| | | | 138/155 |
| 2016/0312930 A1* | 10/2016 | Safari | F16L 58/08 |
| 2018/0030557 A1 | 2/2018 | Goto et al. | |
| 2018/0031152 A1* | 2/2018 | Rajagopalan | B23K 9/0282 |
| 2021/0071807 A1* | 3/2021 | Alghamdi | B23K 9/173 |

FOREIGN PATENT DOCUMENTS

| | | |
|---|---|---|
| JP | 2006281217 A | 10/2006 |
| JP | 4442541 B2 | 3/2010 |
| JP | 2010209471 A | 9/2010 |
| JP | 5292830 B2 | 9/2013 |
| JP | 5316721 B2 | 10/2013 |
| JP | 5605526 B2 | 10/2014 |
| JP | 5679114 B2 | 3/2015 |
| JP | 5776398 B2 | 9/2015 |
| JP | 5886238 B2 | 3/2016 |
| JP | 6004144 B1 | 10/2016 |
| JP | 2017214618 A | 12/2017 |
| WO | 9322592 A1 | 11/1993 |

OTHER PUBLICATIONS

International Search Report and Written Opinion for International Application No. PCT/JP2019/037380, dated Nov. 26, 2019, 5 pages.

* cited by examiner

LONG STEEL PIPE FOR REEL-LAY INSTALLATION AND METHOD FOR PRODUCING THE SAME

CROSS REFERENCE TO RELATED APPLICATIONS

This is the U.S. National Phase application of PCT/JP2019/037380, filed Sep. 24, 2019, which claims priority to Japanese Patent Application No. 2018-184770, filed Sep. 28, 2018 and Japanese Patent Application No. 2018-184771, filed Sep. 28, 2018, the disclosures of these applications being incorporated herein by reference in their entireties for all purposes.

FIELD OF THE INVENTION

The present invention relates to a long steel pipe suitable for reel-lay installation of a submarine pipeline, and more particularly to a long steel pipe for reel-lay installation with high buckling resistance and a method for producing the long steel pipe for reel-lay installation.

BACKGROUND OF THE INVENTION

A reel-lay installation method (hereinafter referred to also as a reel-barge method) has recently been commonly used as a method for installing a submarine pipeline. The reel-lay installation method is an efficient submarine pipeline installation method used especially in northern Europe. In reel-lay installation, a steel pipe having a long length (hereinafter referred to also as a long steel pipe) is formed at an onshore spool base (facility) by successively girth-welding longitudinal ends of steel pipes for a line pipe, and is subjected to coating or other treatment. Then, the long steel pipe is spooled onto a reel on an installation vessel (barge), transported to an offshore installation site, and unwound (unspooled) from the reel for pipeline installation on the seabed.

During reel-lay installation of a pipeline, the long steel pipe repeatedly receives stress (tensile and compressive) in a pipe longitudinal direction by being bent and straightened when the long steel pipe is spooled onto the reel, unspooled from the reel, and passed over an aligner and through a straightener. When the long steel pipe is spooled onto the reel, compressive strain is generated at the inner side (intrados) of the long steel pipe, and tensile strain is generated at the outer side (extrados) of the long steel pipe. Accordingly, there is a risk that local buckling will occur at the inner side (intrados) of the spooled long steel pipe and that local fracture will occur at the outer side (extrados) of the spooled long steel pipe.

To prevent such local fracture and buckling, seamless steel pipes have commonly been used as steel pipes for reel-lay installation from the viewpoint of quality and strength. However, to reduce the production cost, the use of inexpensive electric resistance welded (ERW) steel pipes has been discussed. Accordingly, inexpensive ERW steel pipes with high weld toughness have been desired for use as steel pipes for reel-lay installation.

Accordingly, Patent Literature 1, for example, proposes "Electric Resistance Welded Steel Pipe with Excellent Weld Toughness for Line Pipe".

The ERW steel pipe described in Patent Literature 1 has a composition containing, on a mass percent basis, C: 0.01-0.15%, Si: 0.005-0.9%, Mn: 0.2-1.45%, P: 0.01% or less, S: 0.01% or less, Al: 0.1% or less, and Ca: 0.005% or less. The area fraction of minute defects having a maximum length of less than 50 μm in a projection plane of an ERW portion is 0.000006-0.028%, and energy absorbed in a V-notch Charpy impact test at a test temperature of −40° C. is 315 J of more. The ERW steel pipe has excellent weld toughness.

According to the technology described in Patent Literature 1, the toughness of the ERW portion (seam) is increased by reducing the amount of minute defects that remain in the ERW portion.

With such an improvement in the quality of ERW steel pipes, ERW steel pipes for reel-lay installation and hot-rolled steel sheets for the ERW steel pipes have been proposed.

For example, Patent Literature 2 proposes "Method for Producing Low-Yield-Ratio High-Strength Hot-Rolled Steel Sheet with Excellent Low-Temperature Toughness".

The technology described in Patent Literature 2 provides a method for producing a low-yield-ratio high-strength hot-rolled steel sheet, the method including a hot-rolling step, a cooling step, and a coiling step. In the hot-rolling step, a steel having a composition containing, on a mass percent basis, C: 0.03-0.10%, Si: 0.10-0.50%, Mn: 1.4-2.2%, P: 0.025% or less, S: 0.005% or less, Al: 0.005-0.10%, Nb: 0.02-0.10%, Ti: 0.001-0.030%, Mo: 0.05-0.50%, Cr: 0.05-0.50%, and Ni: 0.001-1.00%, with the balance being Fe and unavoidable impurities, is heated to a heating temperature of 1050-1300° C. and then subjected to rough rolling to obtain a sheet bar. The sheet bar is subjected to finishing rolling in which a cumulative reduction ratio is 50% or more in a temperature range of 930° C. or less to obtain a hot-rolled steel sheet. In the cooling step, cooling of the hot-rolled steel sheet is started immediately after the finishing rolling so that an average cooling speed is 5-60° C./s in a central portion in the thickness direction and that the temperature is reduced to a cooling stop temperature range of Bs point to 450° C. In the coiling step, the hot-rolled steel sheet is wound in the shape of a coil, retained for 60 seconds or more and less than 600 seconds, and then cooled.

The technology described in Patent Literature 2 enables easy and inexpensive production of a low-yield-ratio high-strength hot-rolled steel sheet with excellent low-temperature toughness, the hot-rolled steel sheet having a microstructure containing fine bainitic ferrite as a main phase and finely dispersed massive martensite as a second phase and being suitable for forming an ERW steel pipe for a pipeline to be installed by the reel-barge method or an ERW steel pipe for a pipeline required to be earthquake-resistant.

Patent Literature 3 proposes "Method for Producing Low-YR Electric Resistance Welded Steel Pipe for Line Pipe". The technology described in Patent Literature 3 provides a method for producing a low-yield-ratio (low-YR) ERW steel pipe. In this method, a steel strip is continuously fed and subjected to entrance correction, and is then formed into a substantially cylindrical open pipe. Then, circumferential end portions of the open pipe are welded together by electric resistance welding to obtain a pipe. The pipe is subjected to rotational correction to adjust the outer dimensions and the shape thereof. In the entrance correction, an average strain of 0.05-7.0% is applied in the thickness direction. In the rotational correction, a compressive strain of 0.2-7.0% is applied in the pipe length direction.

According to the technology described in Patent Literature 3, the basic composition of the steel strip contains, on a mass percent basis, C: 0.02-0.1% and Mn: 0.6-1.8%, and preferably additionally contains Si: 0.01-0.5%, P: 0.01% or less, S: 0.01% or less, and Al: 0.1% or less. In addition, the carbon equivalent (Ceq) is less than 0.44%, and the balance is substantially Fe. To improve the strength, yield ratio, and toughness of the steel pipe, the steel strip may further contain one or two selected from Cu: 0.5% or less and Ni: 0.5% or less; one or two selected from Cr: 0.5% or less and Mo: 0.5% or less; or Ca: 0.005% or less.

According to the technology described in Patent Literature 3, a low-yield-ratio (low-YR) ERW steel pipe for a line pipe can be produced without using an additional facility or causing a reduction in the yield by appropriately combining the material composition, conditions of the entrance correction, and conditions of the rotational correction.

Patent Literature 4 proposes "Electric Resistance Welded Steel Pipe without Increase in Yield Ratio after Coating and Heating and Method for Producing the Same".

The technology described in Patent Literature 4 provides a method for producing an ERW steel pipe, the method including hot-rolling of a steel slab into a steel sheet and coiling of the hot-rolled steel sheet at 600° C. or less. The steel slab contains, on a mass percent basis, C: 0.03-0.12%, Si: 0.03-0.5%, Mn: 0.5-2.0%, P: 0.03% or less, S: 0.003% or less, Al: 0.10% or less, Nb: 0.003% or more and less than 0.02%, Ti: 0.005-0.03%, and N: 0.006% or less, satisfies Ti>3.4 N, has a weld cracking parameter Pcm (%) of 0.21 or less, and has a balance of Fe and unavoidable impurities. The hot-rolled steel sheet is formed into a tubular shape, and facing surfaces thereof are welded together by electric resistance welding to form an ERW steel pipe. When the ERW steel pipe, to which strain is applied, is heated and tempered in a heating temperature range of 400-720° C. and subjected to a heat treatment at a heat treatment temperature of 250° C. for a heat treatment time of 1 h, a change in the yield strength of the ERW steel pipe caused by the heat treatment is 30 MPa or less.

The technology described in Patent Literature 4 enables production of an ERW steel pipe suitable for a line pipe and having excellent deformation characteristics with which the yield ratio can be maintained at a low level after tempering and with which an increase in the yield ratio due to coating and heating can be reduced.

Patent Literature 5 proposes "Hot-Rolled Steel Sheet and Method for Producing the Same".

The technology described in Patent Literature 5 provides a hot-rolled steel sheet having a composition containing, on a mass percent basis, C: 0.03-0.10%, Si: 0.01-0.50%, Mn: 1.4-2.2%, P: 0.025% or less, S: 0.005% or less, Al: 0.005-0.10%, Nb: 0.02-0.10%, Ti: 0.001-0.030%, Mo: 0.01-0.50%, Cr: 0.01-0.50%, and Ni: 0.01-0.50%, with the balance being Fe and unavoidable impurities. The hot-rolled steel sheet includes a surface layer and an inner layer. The surface layer has a microstructure including a bainitic ferrite phase or both a bainitic ferrite phase and a tempered martensite phase, the bainitic ferrite phase having a lath thickness of 0.2-1.6 µm. The inner layer has a microstructure including, in terms of area fraction, 50% or more of a bainitic ferrite phase and, as a second phase, 1.4-15% of massive martensite with an aspect ratio of less than 5.0. The bainitic ferrite phase in the inner layer has a lath thickness of 0.2-1.6 µm.

According to the technology described in Patent Literature 5, a low-yield-ratio high-strength hot-rolled steel sheet can be easily produced without special heat treatment, and an ERW steel pipe for a line pipe to be installed by the reel-barge method can be easily and inexpensively produced.

Patent Literature 6 proposes "Low-Yield-Ratio High-Strength Hot-Rolled Steel Sheet with Excellent Low-Temperature Toughness and Method for Producing the Same".

The low-yield-ratio high-strength hot-rolled steel sheet described in Patent Literature 6 has a composition containing, on a mass percent basis, C: 0.03-0.11%, Si: 0.01-0.50%, Mn: 1.0-2.2%, P: 0.025% or less, S: 0.005% or less, Al: 0.005-0.10%, Nb: 0.01-0.10%, Ti: 0.001-0.05%, and B: 0.0005% or less. The composition additionally contains one, two, or more selected from Cr: 0.01-1.0%, Mo: 0.01-0.5%, and Ni: 0.01-0.5% such that Mneq defined as Mneq (%)=Mn+0.26Si+1.30Cr+2.67Mo+0.8Ni is in the range of 2.0-4.0%, with the balance being Fe and unavoidable impurities. The hot-rolled steel sheet has a microstructure including bainitic ferrite as a main phase and at least 3.0% or more of martensite in terms of area fraction as a second phase, the martensite having a maximum size of 10 µm or less and an average size of 0.5-5.0 µm. The average grain size of the bainitic ferrite is 10 µm or less. The hot-rolled steel sheet is a low-yield-ratio high-strength hot-rolled steel sheet with excellent low-temperature toughness having a yield strength of 480 MPa or more in a direction of 30° with respect to the rolling direction, a fracture appearance transition temperature vTrs of −80° C. or less, and a yield ratio of 85% or less.

According to the technology described in Patent Literature 6, a low-yield-ratio high-strength hot-rolled steel sheet with excellent low-temperature toughness can be easily produced without special heat treatment, and an ERW steel pipe for a line pipe to be installed by the reel-barge method can be easily and inexpensively produced.

Patent Literature 7 describes "Low-Yield-Ratio High-Strength Hot-Rolled Steel Sheet with Excellent Low-Temperature Toughness and Method for Producing the Same".

The low-yield-ratio high-strength hot-rolled steel sheet described in Patent Literature 7 has a composition containing, on a mass percent basis, C: 0.03-0.10%, Si: 0.10-0.50%, Mn: 1.4-2.2%, P: 0.025% or less, S: 0.005% or less, Al: 0.005-0.10%, Nb: 0.02-0.10%, Ti: 0.001-0.030%, Mo: 0.05-0.50%, Cr: 0.05-0.50%, and Ni: 0.01-0.50%, with the balance being Fe and unavoidable impurities. The low-yield-ratio high-strength hot-rolled steel sheet has a microstructure including bainitic ferrite as a main phase and, in terms of area fraction, 1.4-15% of massive martensite with an aspect ratio of less than 5.0 as a second phase. The average grain size of the bainitic ferrite is 10 µm or less. The low-yield-ratio high-strength hot-rolled steel sheet has excellent low-temperature toughness.

According to the technology described in Patent Literature 7, a low-yield-ratio high-strength hot-rolled steel sheet with excellent low-temperature toughness can be easily produced without special heat treatment, and an ERW steel pipe for a line pipe to be installed by the reel-barge method can be easily and inexpensively produced.

Patent Literature 8 proposes "Electric Resistance Welded Steel Pipe for Line Pipe and Method for Producing the Same".

The technology described in Patent Literature 8 provides a method for producing an ERW steel pipe for a line pipe, the method including hot-rolling of a steel slab into a steel sheet and coiling of the hot-rolled steel sheet at 600° C. or less. The steel slab contains, on a mass percent basis, C: 0.03-0.12%, Si: 0.03-0.5%, Mn: 0.5-2.0%, P: 0.03% or less, S: 0.003% or less, Al: 0.10% or less, Nb: 0.003% or more and 0.009% or less, Ti: 0.005-0.03%, and N: 0.006% or less, satisfies Ti>3.4 N, has a weld cracking parameter Pcm (%) of 0.21 or less, and has a balance of Fe and unavoidable impurities. The hot-rolled steel sheet is formed into a tubular shape, and facing surfaces thereof are welded together by electric resistance welding to form an ERW steel pipe. The ERW steel pipe, to which strain is applied, is heated and tempered in a heating temperature range of 400-720° C.

The technology described in Patent Literature 8 enables production of an ERW steel pipe suitable for a line pipe and having excellent deformation characteristics with which the yield ratio can be maintained at a low level after tempering and with which an increase in the yield ratio due to coating and heating can be reduced.

Patent Literature 9 proposes "High-Strength Electric Resistance Welded Steel Pipe and Method for Producing the Same" suitable for reel barge installation.

The high-strength ERW steel pipe described in Patent Literature 9 has a composition containing, on a mass percent basis, C: 0.04-0.15%, Si: 0.10-0.50%, Mn: 1.0-2.2%, P: 0.050% or less, S: 0.005% or less, Cr: 0.2-1.0%, Ti: 0.005-0.030%, and Al: 0.010-0.050%, with the balance being Fe and unavoidable impurities. The ERW steel pipe has a microstructure including, in terms of volume fraction, 70% or more of polygonal ferrite and 3-20% of retained austenite, with the balance being one, two, or more selected from martensite, bainite, and pearlite, the polygonal ferrite having an average grain size of 5 μm or more and an aspect ratio of 1.40 or less.

According to the technology described in Patent Literature 9, a high-strength ERW steel pipe with excellent bending characteristics having a high strength of Grade X60 or more can be inexpensively produced without performing heat treatment on the entire pipe.

PATENT LITERATURE

PTL 1: Japanese Patent No. 5292830
PTL 2: Japanese Unexamined Patent Application Publication No. 2017-214618
PTL 3: Japanese Patent No. 4442541
PTL 4: Japanese Patent No. 5316721
PTL 5: Japanese Patent No. 5605526
PTL 6: Japanese Patent No. 5679114
PTL 7: Japanese Patent No. 5776398
PTL 8: Japanese Patent No. 5886238
PTL 9: Japanese Patent No. 6004144

SUMMARY OF THE INVENTION

However, when an ERW steel pipe with which (wall thickness t)/(outer diameter D) is high (hereinafter referred to also as a high-(t/D) ERW steel pipe) is produced by using the hot-rolled steel sheet described in Patent Literature 2, processing strain is applied during pipe formation, which in particular causes an increase in the yield strength. Accordingly, the ERW steel pipe has an increased yield ratio and a reduced uniform elongation in a pipe axial direction (pipe longitudinal direction). The yield strength is further increased due to coating and heating (heating temperature: about 250° C.) for reel-lay installation, and it is therefore expected that the ERW steel pipe will have a higher yield ratio and a lower uniform elongation. When ERW steel pipes having such high-yield-ratio low-uniform-elongation portions are used in reel-lay installation of a pipeline, there is a risk that compressive strain and tensile strain generated in the long steel pipe spooled on the reel will easily cause local buckling on the inner side (intrados) of the long steel pipe and local fracture on the outer side (extrados) of the long steel pipe.

According to the technology described in Patent Literature 3, a correction facility having appropriate capabilities needs to be selected and installed to achieve appropriate combination of conditions of the entrance correction and conditions of the rotational correction for applying appropriate amounts of strains in the thickness direction and the pipe longitudinal direction. In addition, according to the low-yield-ratio (low-YR) ERW steel pipe described in Patent Literature 3, there is a risk that the yield strength of the ERW steel pipe will be increased due to coating and heating (heating temperature: about 250° C.) for reel-lay installation and that the ERW steel pipe will have a high yield ratio and a low uniform elongation.

According to the technology described in Patent Literature 4, an increase in the yield ratio due to coating and heating can be reduced by performing a tempering process after pipe formation and electric resistance welding. However, Patent Literature 4 does not describe any tempering process for a weld (girth weld) obtained by butt-welding longitudinal ends of ERW steel pipes together. In order for the girth weld to also have a low yield ratio, a tempering process needs to be performed on the girth weld. However, it is unrealistic to perform a tempering process on the girth weld when girth welding is performed for reel-lay installation.

When an ERW steel pipe with which (wall thickness t)/(outer diameter D) is high (hereinafter referred to also as a high-(t/D) ERW steel pipe) is produced by using the hot-rolled steel sheets described in Patent Literatures 5, 6, and 7, processing strain is applied during pipe formation, which in particular causes an increase in the yield strength. Accordingly, the ERW steel pipe has an increased yield ratio and a reduced uniform elongation in the pipe longitudinal direction. The yield strength is further increased due to coating and heating (heating temperature: about 250° C.) for reel-lay installation, and it is therefore expected that the ERW steel pipe will have a higher yield ratio and a lower uniform elongation. When ERW steel pipes having such a high yield ratio and a low uniform elongation are used, there is a risk that compressive strain and tensile strain generated in the long steel pipe will easily cause local buckling on the inner side (intrados) of the long steel pipe and local fracture on the outer side (extrados) of the long steel pipe.

According to the technology described in Patent Literature 8, a tempering process is performed after pipe formation and electric resistance welding, so that an increase in the yield ratio due to coating and heating performed thereafter can be reduced. However, Patent Literature 8 does not describe any tempering process for a weld (girth weld) obtained by butt-welding longitudinal ends of ERW steel pipes together. In order for the girth weld to also have a low yield ratio, a tempering process needs to be performed on the girth weld. However, it is unrealistic to perform a tempering process on the girth weld when girth welding is performed for reel-lay installation.

When a high-strength ERW steel pipe with excellent bending characteristics produced by using the technology described in Patent Literature 9 is subjected to coating and heating (heating temperature: about 250° C.) for reel-lay installation, the yield strength thereof is further increased. Accordingly, it is expected that the ERW steel pipe will have a higher yield ratio and a lower uniform elongation. When ERW steel pipes having such high-yield-ratio low-uniform-elongation tensile characteristics are used, there is a risk that compressive strain and tensile strain generated in the long steel pipe during reel spooling will easily cause local buckling on the inner side (intrados) of the long steel pipe and local fracture on the outer side (extrados) of the long steel pipe.

An object according to aspects of the present invention is to solve the above-described problems of the related art and to provide a long steel pipe for reel-lay installation obtained by joining ERW steel pipes and having high buckling resistance and a method for producing the long steel pipe for reel-lay installation.

The term "long steel pipe" as used herein means a pipe having a long length obtained by successively girth-welding longitudinal ends of a plurality of steel pipes.

According to a long steel pipe for reel-lay installation and a method for producing the long steel pipe for reel-lay installation according to aspects of the present invention, the long steel pipe for reel-lay installation includes a plurality of ERW steel pipes joined in the pipe longitudinal direction with a girth weld provided therebetween. A seam position of each ERW steel pipe is defined as a 0 o'clock cross-sectional position, and positions that evenly divide a pipe cross section of the ERW steel pipe into 12 sections around a pipe axis are defined as 0 o'clock to 11 o'clock cross-sectional positions in a clockwise order. The ERW steel pipes are successively joined in the pipe longitudinal direction such that the 0 o'clock cross-sectional position of one of adjacent ERW steel pipes faces an area from the 2 o'clock cross-sectional position to the 4 o'clock cross-sectional position or an area from the 8 o'clock cross-sectional position to the 10 o'clock cross-sectional position of the other of the adjacent ERW steel pipes.

To achieve the above-described object, the inventors of the present invention have studied the tensile characteristics of an ERW steel pipe having an outer diameter of 323.9 mm, a wall thickness of 15.9 mm, and a tensile strength of 510 MPa at each of the circumferential positions illustrated in FIG. 1. Tensile test pieces (full thickness, GL: 50.8 mm) were extracted from the ERW steel pipe at each of the cross-sectional positions (positions on the pipe cross section) illustrated in FIG. 1 (seam position: 0 o'clock) so that the tensile direction is the pipe longitudinal direction. A tensile test was performed to measure the tensile characteristics (yield strength YS (0.5% offset), tensile strength TS, and uniform elongation uEl) at each of the cross-sectional positions (positions on the cross section of the pipe). The tensile characteristics of the ERW steel pipe were measured both when no treatment was performed after pipe formation and when a heat treatment (250° C.×1 h) simulating coating and heating was performed after pipe formation. The results are shown in Table 1. A high-strength steel pipe (hereinafter referred to as a strong pipe) was also subjected to a similar test. The results are shown in Table 2.

TABLE 1

| Cross-Sectional Position** | Tensile Characteristics* (No Treatment) | | | | Tensile Characteristics* After Heat Treatment (250° C. × 1 h) | | | |
|---|---|---|---|---|---|---|---|---|
| | YS (MPa) | TS (MPa) | uEl (%) | Y/T | YS (MPa) | TS (MPa) | uEl (%) | Y/T |
| 0 o'clock*** | 503 | 512 | 2.1 | 0.98 | 505 | 510 | 1.9 | 0.99 |
| 1 o'clock | 487 | 510 | 5.3 | 0.95 | 489 | 509 | 4.8 | 0.96 |
| 2 o'clock | 424 | 510 | 11.3 | 0.83 | 429 | 509 | 10.3 | 0.84 |
| 3 o'clock | 424 | 511 | 12.6 | 0.83 | 422 | 510 | 10.0 | 0.83 |
| 4 o'clock | 421 | 512 | 11.2 | 0.82 | 425 | 511 | 10.2 | 0.83 |
| 5 o'clock | 479 | 513 | 6.1 | 0.93 | 482 | 512 | 5.8 | 0.94 |
| 6 o'clock | 504 | 515 | 2.3 | 0.98 | 509 | 515 | 1.9 | 0.99 |
| 7 o'clock | 489 | 511 | 5.8 | 0.96 | 499 | 509 | 4.8 | 0.98 |
| 8 o'clock | 422 | 513 | 11.7 | 0.82 | 429 | 512 | 10.3 | 0.84 |
| 9 o'clock | 423 | 509 | 11.5 | 0.83 | 431 | 508 | 10.3 | 0.85 |
| 10 o'clock | 423 | 511 | 11.2 | 0.83 | 422 | 509 | 10.2 | 0.83 |
| 11 o'clock | 488 | 516 | 5.4 | 0.95 | 490 | 513 | 4.9 | 0.96 |

*YS: Yield Strength (0.5% Offset), TS: Tensile Strength, uEl: Uniform Elongation, Y/T: Yield Ratio (YS/TS)
**see FIG. 1
***Seam Position

TABLE 2

| Cross-Sectional Position** | Tensile Characteristics* (No Treatment) | | | | Tensile Characteristics* After Heat Treatment (250° C. × 1 h) | | | |
|---|---|---|---|---|---|---|---|---|
| | YS (MPa) | TS (MPa) | uEl (%) | Y/T | YS (MPa) | TS (MPa) | uEl (%) | Y/T |
| 0 o'clock*** | 572 | 585 | 2.2 | 0.98 | 578 | 585 | 2.1 | 0.99 |
| 1 o'clock | 565 | 586 | 5.4 | 0.96 | 568 | 583 | 5.1 | 0.97 |
| 2 o'clock | 510 | 585 | 11.3 | 0.87 | 510 | 585 | 10.6 | 0.87 |
| 3 o'clock | 477 | 585 | 11.2 | 0.82 | 481 | 585 | 10.0 | 0.82 |
| 4 o'clock | 481 | 586 | 11.2 | 0.82 | 485 | 586 | 10.7 | 0.83 |
| 5 o'clock | 555 | 586 | 5.8 | 0.95 | 559 | 586 | 5.2 | 0.95 |
| 6 o'clock | 573 | 587 | 2.4 | 0.98 | 581 | 587 | 1.8 | 0.99 |
| 7 o'clock | 556 | 587 | 5.8 | 0.95 | 559 | 586 | 5.1 | 0.95 |
| 8 o'clock | 483 | 590 | 11.5 | 0.82 | 484 | 589 | 10.1 | 0.82 |
| 9 o'clock | 485 | 585 | 11.6 | 0.83 | 486 | 584 | 10.2 | 0.83 |
| 10 o'clock | 483 | 587 | 11.5 | 0.82 | 481 | 586 | 10.3 | 0.82 |
| 11 o'clock | 564 | 590 | 5.3 | 0.96 | 569 | 589 | 4.9 | 0.97 |

*YS: Yield Strength (0.5% Offset), TS: Tensile Strength, uEl: Uniform Elongation, Y/T: Yield Ratio (YS/TS)
**see FIG. 1
***Seam Position Table 1 shows that, at the 0 o'clock cross-sectional position (seam portion) and the 6 o'clock cross-sectional position, the ERW steel pipe has high-Y/T low-uEl tensile characteristics with YS/TS (hereinafter referred to also as a yield ratio or Y/T) as high as 0.98 and a uniform elongation uEl as low as 2.1-2.3%. In contrast, at the 2 o'clock cross-sectional position and the 4 o'clock cross-sectional position, the ERW steel pipe has low-Y/T high-uEl tensile characteristics with Y/T as low as 0.82-0.83 and uEl as high as above 11%. Also, at the 8 o'clock cross-sectional position and the 10 o'clock cross-sectional position, the ERW steel pipe has low-Y/T high-uEl tensile characteristics. The 1 o'clock, 5 o'clock, 7 o'clock, and 11 o'clock cross-sectional positions represent transition regions between the above-mentioned positions that are adjacent to each other. The tensile characteristics at each position depend on the pipe formation method (production method) for the ERW steel pipe.

The above-described ERW steel pipe is produced by a common production method for an ERW steel pipe. More specifically, a hot-rolled steel sheet of predetermined dimensions is used as a material, and the material is bent in a width direction to form an open pipe. The ends of the open pipe in the width direction are butted against each other and welded together by electric resistance welding to form a seam portion. Then, the outer diameter is adjusted to obtain the product (ERW steel pipe).

The tensile characteristics of the ERW steel pipe that has been subjected to heat treatment (250° C.×1 h) simulating coating and heating after pipe formation are also shown in Table 1. After the heat treatment, the steel pipe has tensile characteristics with higher Y/T and low uEl because YS (0.5% offset) at each position is increased from that at the same position when no treatment is performed after pipe formation.

The tensile characteristics of the high-strength steel pipe (strong pipe) shown in Table 2 have the same trend as that of the tensile characteristics of the low-strength steel pipe shown in Table 1 at each circumferential position except that the strength is high.

In reel-lay installation, ends of a plurality of ERW steel pipes in the pipe longitudinal direction are successively joined by girth welding to form a long steel pipe. The inventors of the present invention have found that, when the ERW steel pipes that are used have different tensile characteristics at each cross-sectional position (each circumferential position) as described above, there is a risk that buckling or fracture will occur in the long steel pipe when the long steel pipe is spooled onto a reel depending on the positions of the butted ends.

The results of studies based on which aspects of the present invention have been made will now be described.

Strains generated in a long steel pipe (pipe) 1 in the pipe longitudinal direction (axial direction) when the long steel pipe 1 is bent onto a reel were analyzed by a finite element method.

Referring to FIG. 2, the analysis was based on the assumption that the long steel pipe 1 having a length of 11500 mm was bent onto a reeling former 2 having a radius of 8250 mm. Assuming that the long steel pipe 1 was bent onto the reeling former 2 by applying a load thereto, strains generated in the pipe longitudinal direction (axial direction) at the reel outer side (extrados) and the reel inner side (intrados) of the long steel pipe 1 and the roundness of the long steel pipe 1 were calculated. Referring to FIG. 2B, the analysis was performed to the final stage in which the long steel pipe 1 comes into close contact with the outer periphery of the reeling former 2. The radius of the reeling former 2 is 8250 mm, which is a reel radius of a common reel-lay vessel. The long steel pipe 1 to be bent was assumed to be obtained by butting longitudinal ends of ERW steel pipes 12 having a length of 2500 mm against both longitudinal ends of an ERW steel pipe 11 having a length of 6500 mm and joining the butted longitudinal ends by girth welding to form girth welds. The ERW steel pipes 12 having the length of 2500 mm have a strength greater than that of the ERW steel pipe 11 having the length of 6500 mm, and are hereinafter referred to also as strong pipes. The ERW steel pipe 11 having the length of 6500 mm is referred to as a weak pipe.

Since the analysis needed to be carried out under conditions close to those in an actual operation, the long steel pipe was assumed to be obtained by butting the longitudinal ends of the ERW steel pipes 12 having the length of 2500 mm (strong pipes) against both longitudinal ends of the ERW steel pipe 11 having the length of 6500 mm (weak pipe) and joining the butted longitudinal ends by girth welding to form girth welds. In an actual operation of reel-lay installation, adjacent ERW steel pipes that are joined to each other may have different strengths. In such a case, when the long steel pipe 1 is bent onto a reel, a particularly large axial strain is generated in the ERW steel pipe (weak pipe) at a location near the girth weld, and local buckling or fracture may occur.

The analysis was carried out on the assumption that the longitudinal ends of the adjacent ERW steel pipes 11 and 12 were butted against each and girth-welded with various combinations of cross-sectional positions of the adjacent ERW steel pipes 11 and 12 as shown in Table 3.

TABLE 3

| | Combination of Steel Pipes Steel Pipe 12 | | | |
|---|---|---|---|---|
| | Cross- | Tensile Characteristics at Each Position | | |
| Case No. | Sectional Position* | YS (MPa) | TS (MPa) | uEl (%) | Y/T |
| 1 | 0 o'clock (Seam) | 585 | 585 | 0.29 | 1.000 |
| 2 | 0 o'clock (Seam) | 578 | 585 | 2.01 | 0.988 |
| 3 | 3 o'clock | 481 | 585 | 10.04 | 0.822 |
| 4 | 0 o'clock (Seam) | 585 | 585 | 0.29 | 1.000 |
| 5 | 0 o'clock (Seam) | 585 | 585 | 0.29 | 1.000 |
| 6 | 0 o'clock (Seam) | 578 | 585 | 2.01 | 0.988 |
| 7 | 0 o'clock (Seam) | 578 | 585 | 2.01 | 0.988 |
| 8 | 3 o'clock | 481 | 585 | 10.04 | 0.822 |
| 9 | 3 o'clock | 481 | 585 | 10.04 | 0.822 |

| | Steel Pipe 11 | | | |
|---|---|---|---|---|
| | Cross- | Tensile Characteristics at Each Position | | |
| Case No. | Sectional Position* | YS (MPa) | TS (MPa) | uEl (%) | Y/T |
| 1 | 0 o'clock (Seam) | 510 | 510 | 0.25 | 1.000 |
| 2 | 0 o'clock (Seam) | 505 | 510 | 2.00 | 0.989 |
| 3 | 3 o'clock | 422 | 510 | 10.00 | 0.827 |
| 4 | 0 o'clock (Seam) | 505 | 510 | 2.00 | 0.989 |
| 5 | 3 o'clock | 422 | 510 | 10.00 | 0.827 |
| 6 | 0 o'clock (Seam) | 510 | 510 | 0.25 | 1.000 |

TABLE 3-continued

| 7 | 3 o'clock | 422 | 510 | 10.00 | 0.827 |
| 8 | 0 o'clock (Seam) | 510 | 510 | 0.25 | 1.000 |
| 9 | 0 o'clock | 505 | 510 | 2.00 | 0.989 |

Steel Pipe 12

| Case No. | Cross-Sectional Position* | Tensile Characteristics at Each Position | | | |
| --- | --- | --- | --- | --- | --- |
| | | YS (MPa) | TS (MPa) | uEl (%) | Y/T |
| 1 | 0 o'clock (Seam) | 585 | 585 | 0.29 | 1.000 |
| 2 | 0 o'clock (Seam) | 578 | 585 | 2.01 | 0.988 |
| 3 | 3 o'clock | 481 | 585 | 10.04 | 0.822 |
| 4 | 0 o'clock (Seam) | 585 | 585 | 0.29 | 1.000 |
| 5 | 0 o'clock (Seam) | 585 | 585 | 0.29 | 1.000 |
| 6 | 0 o'clock (Seam) | 578 | 585 | 2.01 | 0.988 |
| 7 | 0 o'clock (Seam) | 578 | 585 | 2.01 | 0.988 |
| 8 | 3 o'clock | 481 | 585 | 10.04 | 0.822 |
| 9 | 3 o'clock | 481 | 585 | 10.04 | 0.822 |

*Assumed Position

With regard to the tensile characteristics at the 0 o'clock cross-sectional position (seam) used in the analysis, the tensile characteristics of the ERW steel pipe 11 (weak pipe) were determined, by referring to the tensile characteristics after heat treatment (250° C.×1 h) shown in Table 1, as being represented by uEl: 2.00%, YS: 505 MPa, TS: 510 MPa, and Y/T: 0.989 (high-Y/T low-uEl tensile characteristics), as shown in Table 3. Also, the tensile characteristics of the ERW steel pipes 12 (strong pipes) were determined, by referring to the tensile characteristics after heat treatment (250° C.×1 h) shown in Table 2, as being represented by uEl: 2.01%, YS: 578 MPa, TS: 585 MPa, and Y/T: 0.988 (high-Y/T low-uEl tensile characteristics), as shown in Table 3.

A similar analysis was also performed on the assumption that the tensile characteristics at the 0 o'clock cross-sectional position (seam) were extra-high-Y/T low uEl tensile characteristics with Y/T set to 1.000. In this case, with regard to the tensile characteristics at the 0 o'clock cross-sectional position (seam), the tensile characteristics of the ERW steel pipe 11 (weak pipe) were represented by uEl: 0.25%, YS: 510 MPa, TS: 510 MPa, and Y/T: 1.000 (high-Y/T low-uEl tensile characteristics), as shown in Table 3, and the tensile characteristics of the ERW steel pipes 12 (strong pipes) were represented by uEl: 0.29%, YS: 585 MPa, TS: 585 MPa, and Y/T: 1.000 (high-Y/T low-uEl tensile characteristics), as shown in Table 3.

The tensile characteristics in the area from the 2 o'clock cross-sectional position to the 4 o'clock cross-sectional position were determined, by referring to the characteristics after the heat treatment (250° C.×1 h) shown in Tables 1 and 2, such that the tensile characteristics of the ERW steel pipe 11 (weak pipe) were represented by uEl: 10.00%, YS: 422 MPa, TS: 510 MPa, and Y/T: 0.827 (low-Y/T high-uEl tensile characteristics), as shown in Table 3, and such that the tensile characteristics of the ERW steel pipes (strong pipes) were represented by uEl: 10.04%, YS: 481 MPa, TS: 585 MPa, and Y/T: 0.822 (low-Y/T high-uEl tensile characteristics), as shown in Table 3.

Nominal stress-nominal strain curves used in the analysis were created based on the above-described tensile characteristics by using the Swift equation. FIG. 3 shows examples of nominal stress-nominal strain curves used in the analysis. FIG. 3A shows the curves for the steel pipe 11 (weak pipe), and FIG. 3B shows the curves for the steel pipes 12 (strong pipes).

Nominal stress-nominal strain curves for the girth welds were set to overmatch the nominal stress-nominal strain curves for the ERW steel pipes 12. In the analysis, the assumed cross-sectional position of the ERW steel pipe (weak pipe) shown in Table 3 was set to be on the reel inner side (intrados) or the reel outer side (extrados).

The axial strain generated on the reel inner side of the long steel pipe 1 will be referred to as an intrados axial strain, and the axial strain generated on the reel outer side will be referred to as an extrados axial strain. The roundness (DNV ovality) was calculated as {(Dmax−Dmin)/Dnominal}.

The results are shown in FIGS. 4 to 6.

FIGS. 4 to 6 show that, under deformation conditions such that the long steel pipe is bent onto a reel by applying a load thereto, the axial strains concentrate in the ERW steel pipe 11 (weak pipe) at locations close to the girth welds at the fixed ends. In such a case, the roundness of the ERW steel pipe 11 (weak pipe) also greatly varies at locations close to the girth welds at the fixed ends.

More specifically, when the ERW steel pipe 11 (weak pipe) and the ERW steel pipes 12 (strong pipes) are joined such that the seam positions thereof face each other and when the seam position of the ERW steel pipe 11 (weak pipe) is at the inner side (intrados) or the outer side (extrados), a large intrados axial strain or extrados axial strain occurs in the ERW steel pipe 11 (weak pipe) at, in particular, locations close to the girth welds at the fixed ends. Accordingly, there is a high risk that buckling or fracture will occur.

For example, in Case 1 shown in FIGS. 4A to 4C, large axial strains are generated in the ERW steel pipe 11 (weak pipe) at locations close to the girth welds at the fixed ends: the intrados axial strain at the reel inner side is about −10% (compressive strain), and the extrados axial strain at the reel outer side is about 10% (tensile strain). Case 1 is a case in which the ERW steel pipes are joined together such that the seam positions thereof face each other, the tensile characteristics at the seam positions being extra-high-Y/T low-uEl tensile characteristics with Y/T set to be as high as Y/T: 1.00 and a uniform elongation uEl as low as 0.25 or 0.29. When such a long steel pipe is bent onto a reel, a large intrados axial strain and a large extrados axial strain are generated, and there is a high risk that local buckling or fracture will occur.

In Case 2 shown in FIGS. 4A to 4C (FIGS. 7A and 7B show only Case 2), large axial strains are generated in the ERW steel pipe 11 (weak pipe) at locations close to the girth welds at the fixed ends: the intrados axial strain at the reel inner side is about −6% (compressive strain), and the extrados axial strain at the reel outer side is about 6% (tensile strain). Case 2 is a case in which the longitudinal ends are joined together such that the seam positions (0 o'clock cross-sectional positions) thereof face each other, the tensile characteristics at the seam positions being high-Y/T low-uEl tensile characteristics with Y/T: 0.988-0.989 and uEl: 2.00-2.01%. The axial strains generated in such a long steel pipe are somewhat smaller than those in Case 1, but are still large.

In Case 4 shown in FIGS. 5A to 5C, the tensile characteristics of each ERW steel pipe 12 (strong pipe) at the 0 o'clock cross-sectional position (seam) are changed from the high-Y/T low-uEl tensile characteristics with Y/T: 0.988 and uEl: 2.01% to extra-high-Y/T low-uEl tensile characteristics with Y/T set to be as high as Y/T: 1.00 and a low uniform elongation uEl. Also, in this case, similar to Case 2, the intrados axial strain and the extrados axial strain generated in the ERW steel pipe 11 (weak pipe) at locations close to the girth welds at the fixed ends are about −6% (compressive strain) and about 6% (tensile strain), respectively.

In Case 6 shown in FIGS. 5A to 5C, similar to Case 1, large axial strains are generated in the ERW steel pipe 11 (weak pipe) at locations close to the girth welds at the fixed ends: the intrados axial strain at the reel inner side is about −10% (compressive strain), and the extrados axial strain at the reel outer side is about 10% (tensile strain). Case 6 is a case in which the tensile characteristics of the ERW steel pipe 11 (weak pipe) at the seam position are extra-high-Y/T low-uEl tensile characteristics with Y/T set to be as high as Y/T: 1.00 and a low uniform elongation uEl, in which the tensile characteristics of each ERW steel pipe (strong pipe) at the 0 o'clock cross-sectional position (seam) are high-Y/T low-uEl tensile characteristics with Y/T: 0.988 and uEl: 2.01%, and in which the longitudinal ends are butt-joined together so that the seam positions thereof face each other. When such a long steel pipe is bent onto a reel, a large intrados axial strain and a large extrados axial strain are generated, and there is a high risk that local buckling or fracture will occur.

In contrast, in Case 9 shown in FIGS. 6A to 6C, the long steel pipe 1 is assumed to be obtained by butting the pipe ends against each other such that the seam position of the ERW steel pipe 11 (weak pipe) faces the 3 o'clock cross-sectional position of each ERW steel pipe 12 (strong pipe), and then performing girth welding. In this case, the axial strains generated in the ERW steel pipe 11 (weak pipe) at locations close to the girth welds at the fixed ends when the long steel pipe 1 is bent onto the reel are such that the intrados axial strain is about −3% (compressive strain) and the extrados axial strain is about 3% (tensile strain). Thus, the generated axial strains are significantly less than those in Case 2 and Case 4. FIGS. 8A and 8B show only Case 9.

In Case 9, the long steel pipe 1 to be bent onto the reel is assumed to be obtained by butting the pipe ends against each other such that the 0 o'clock cross-sectional position (seam) of the 6500-mm-long ERW steel pipe 11 (weak pipe) faces the 3 o'clock cross-sectional position of each 2500-mm-long ERW steel pipe 12 (strong pipe) at both longitudinal ends of the ERW steel pipe 11 (weak pipe), and then performing girth welding to obtain the long steel pipe 1.

In Case 8 shown in FIGS. 6A to 6C, the ERW steel pipe (weak pipe) is assumed to have extra-high-Y/T low-uEl tensile characteristics with Y/T set to be as high as Y/T: 1.00 and a uniform elongation uEl of 0.25%, and the long steel pipe 1 is obtained by butting the longitudinal ends such that the 0 o'clock cross-sectional position (seam) of the ERW steel pipe 11 (weak pipe) faces the 3 o'clock cross-sectional position of each ERW steel pipe 12 (strong pipe), and then performing girth welding. Also, in this case, similar to Case 9, the intrados axial strain and the extrados axial strain generated in the ERW steel pipe 11 (weak pipe) at locations close to the girth welds at the fixed ends are about −3% (compressive strain) and about 3% (tensile strain), respectively. Thus, the risk of occurrence of buckling or fracture is low.

In Case 8, the tensile characteristics of the ERW steel pipe 11 (weak pipe) at the 0 o'clock cross-sectional position (seam) are high-Y/T low-uEl tensile characteristics with Y/T higher than that in Case 9. Even when the tensile characteristics at the 0 o'clock cross-sectional position (seam) are such high-Y/T low-uEl tensile characteristics, the generated axial strains can be made as the same level as those in Case 9 by butt-joining the longitudinal ends such that the seam position of the ERW steel pipe 11 (weak pipe) faces the 3 o'clock cross-sectional position of each ERW steel pipe 12 (strong pipe).

In Case 5 shown in FIGS. 5A to 5C and Case 7 shown in FIGS. 6A to 6C, the ERW steel pipes are joined such that the 3 o'clock cross-sectional position of the ERW steel pipe 11 (weak pipe) faces the seam position (0 o'clock cross-sectional position) of each ERW steel pipe 12 (strong pipe). In these cases, the intrados axial strain at the reel inner side and the extrados axial strain at the reel outer side generated in ERW steel pipe 11 (weak pipe) at locations close to the girth welds at the fixed ends are about −5% (compressive strain) and about 5% (tensile strain), respectively. When such a long steel pipe is bent onto the reel, the risk of occurrence of local buckling or fracture is low.

The inventors of the present invention have found from other studies that the risk of buckling or fracture is low when the axial strains are in the range of −6% (compressive strain) to 6% (tensile strain).

Based on the above studies, the inventors of the present invention have found that, when a long steel pipe is formed by successively girth-welding longitudinal ends of a plurality of ERW steel pipes, the intrados axial strain (compressive strain) and the extrados axial strain (tensile strain) generated during reel spooling can be reduced to prevent buckling and fracture and the buckling resistance (fracture resistance) during reel spooling can be significantly increased by forming the long steel pipe in the following manner. That is, the longitudinal ends of adjacent ERW steel pipes are butted against each other and girth-welded such that the seam position of one of the adjacent ERW steel pipes faces an area from the 2 o'clock cross-sectional position to the 4 o'clock cross-sectional position or an area from the 8 o'clock cross-sectional position to the 10 o'clock cross-sectional position of the other of the adjacent ERW steel pipes.

Aspects of the present invention have been made based on the above-described findings and additional studies, and are as follows.

[1] A long steel pipe for reel-lay installation including a plurality of electric resistance welded steel pipes joined in a pipe longitudinal direction with a girth weld provided therebetween, wherein the plurality of electric resistance welded steel pipes include adjacent electric resistance welded steel pipes that are adjacent to other, a seam position of one of the adjacent electric resistance welded steel pipes being defined as a 0 o'clock cross-sectional position and positions that evenly divide a pipe cross section of other of the adjacent electric resistance welded steel pipes into 12 sections around a pipe axis being defined as the 0 o'clock cross-sectional position to an 11 o'clock cross-sectional position in a clockwise order, and wherein the plurality of electric resistance welded steel pipes are joined such that the 0 o'clock cross-sectional position of the one of the adjacent electric resistance welded steel pipes faces an area from the 2 o'clock cross-sectional position to the 4 o'clock cross-sectional position or an area from the 8 o'clock cross-sectional position to the 10 o'clock cross-sectional position of the other of the adjacent electric resistance welded steel pipes.

[2] A long steel pipe for reel-lay installation including a plurality of electric resistance welded steel pipes joined in a pipe longitudinal direction with a girth weld provided therebetween, wherein the plurality of electric resistance welded steel pipes include adjacent electric resistance welded steel pipes that are adjacent to other, a seam position of one of the adjacent electric resistance welded steel pipes being defined as a 0 o'clock cross-sectional position and positions that evenly divide a pipe cross section of other of the adjacent electric resistance welded steel pipes into 12 sections around a pipe axis being defined as the 0 o'clock cross-sectional position to an 11 o'clock cross-sectional position in a clockwise order, and wherein the plurality of electric resistance welded steel pipes are joined such that the 6 o'clock cross-sectional position of the one of the adjacent electric resistance welded steel pipes faces an area from the 2 o'clock cross-sectional position to the 4 o'clock cross-sectional position or an area from the 8 o'clock cross-sectional position to the 10 o'clock cross-sectional position of the other of the adjacent electric resistance welded steel pipes.

[3] The long steel pipe for reel-lay installation according to [1] or [2], wherein one of the adjacent electric resistance welded steel pipes has a tensile strength in a range of 413 MPa to 787 MPa, and other of the adjacent electric resistance welded steel pipes has a tensile strength in a range of 413 MPa to 850 MPa.

[4] The long steel pipe for reel-lay installation according to [3], wherein a tensile strength of the other of the adjacent electric resistance welded steel pipes at the 3 o'clock cross-sectional position is higher than a tensile strength of the one of the adjacent electric resistance welded steel pipes at the 3 o'clock cross-sectional position by 30 MPa or more.

[5] A method for producing the long steel pipe for reel-lay installation according to [1] as a steel pipe having a long length, the method including successively joining longitudinal ends of a plurality of electric resistance welded steel pipes by butt girth welding, wherein a seam position of each electric resistance welded steel pipe is defined as a 0 o'clock cross-sectional position, wherein positions that evenly divide a pipe cross section of each electric resistance welded steel pipe into 12 sections around a pipe axis are defined as the 0 o'clock cross-sectional position to an 11 o'clock cross-sectional position in a clockwise order, and wherein the butt girth welding is performed while the longitudinal ends of adjacent electric resistance welded steel pipes are butted against each other such that the 0 o'clock cross-sectional position of one of the adjacent electric resistance welded steel pipes faces an area from the 2 o'clock cross-sectional position to the 4 o'clock cross-sectional position or an area from the 8 o'clock cross-sectional position to the 10 o'clock cross-sectional position of other of the adjacent electric resistance welded steel pipes.

[6] A method for producing the long steel pipe for reel-lay installation according to [2] as a steel pipe having a long length, the method including successively joining longitudinal ends of a plurality of electric resistance welded steel pipes by butt girth welding, wherein a seam position of each electric resistance welded steel pipe is defined as a 0 o'clock cross-sectional position, wherein positions that evenly divide a pipe cross section of each electric resistance welded steel pipe into 12 sections around a pipe axis are defined as the 0 o'clock cross-sectional position to an 11 o'clock cross-sectional position in a clockwise order, and wherein the butt girth welding is performed while the longitudinal ends of adjacent electric resistance welded steel pipes are butted against each other such that the 6 o'clock cross-sectional position of one of the adjacent electric resistance welded steel pipes faces an area from the 2 o'clock cross-sectional position to the 4 o'clock cross-sectional position or an area from the 8 o'clock cross-sectional position to the 10 o'clock cross-sectional position of other of the adjacent electric resistance welded steel pipes.

[7] The method for producing the long steel pipe for reel-lay installation according to [5] or [6], wherein one of the adjacent electric resistance welded steel pipes has a tensile strength in a range of 413 MPa to 787 MPa, and other of the adjacent electric resistance welded steel pipes has a tensile strength in a range of 413 MPa to 850 MPa.

[8] The method for producing the long steel pipe for reel-lay installation according to [7], wherein a tensile strength of the other of the adjacent electric resistance welded steel pipes at the 3 o'clock cross-sectional position is higher than a tensile strength of the one of the adjacent electric resistance welded steel pipes at the 3 o'clock cross-sectional position by 30 MPa or more.

Aspects of the present invention have a remarkable industrial advantage in that a long steel pipe for reel-lay installation formed of ERW steel pipes and having high buckling resistance can be easily produced without using any special facility or performing any special heat treatment. In particular, aspects of the present invention have a significant advantage in that, even when a position on an ERW steel pipe at which Y/T is high and uEl is low (0 o'clock cross-sectional position (position of seam portion) or 6 o'clock cross-sectional position) is at the reel inner side (intrados) or the reel outer side (extrados) during reel spooling, generated axial strains are small and the risk of buckling or fracture is low.

DETAILED DESCRIPTION OF EMBODIMENTS OF THE INVENTION

Figure 1:
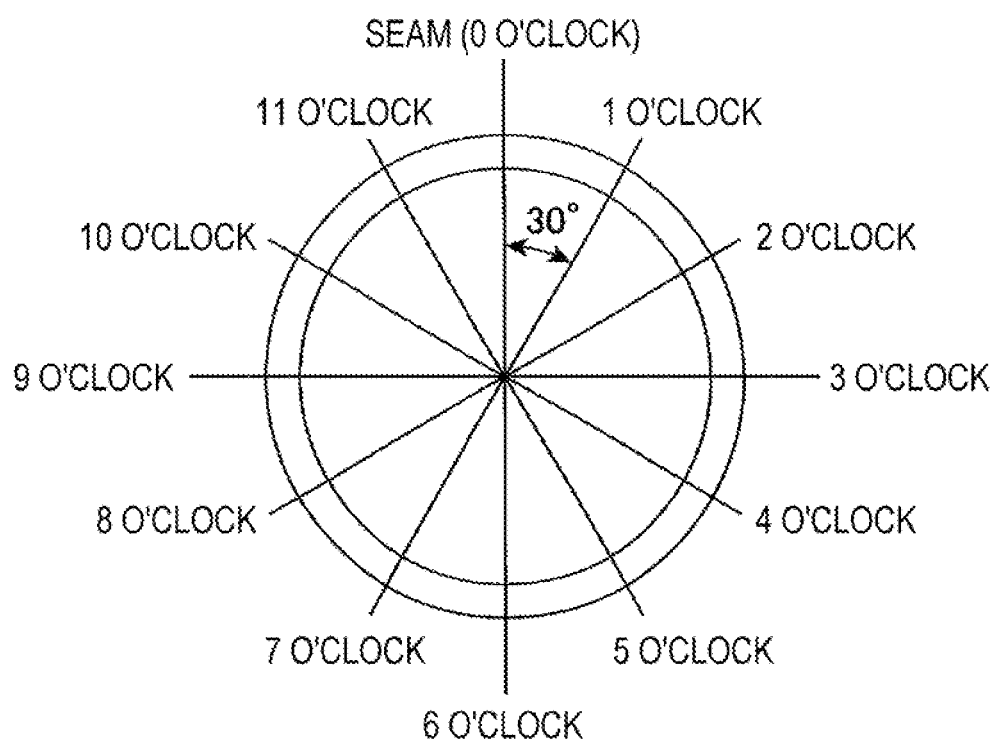
FIG. 1 illustrates the definitions of each circumferential position on a pipe cross section.

In accordance with aspects of the present invention, as illustrated in FIG. 1, positions on a pipe cross section are defined such that a seam position of an ERW steel pipe is a 0 o'clock cross-sectional position and positions that evenly divide the pipe cross section into 12 sections around a pipe axis are the 0 o'clock cross-sectional position (seam) to an 11 o'clock cross-sectional position in a clockwise order.

A long steel pipe according to aspects of the present invention is a steel pipe for reel-lay installation having a long length including a plurality of ERW steel pipes that are successively joined in a pipe longitudinal direction with girth welds provided therebetween. The ERW steel pipes are joined by butting longitudinal ends thereof against each other and successively girth-welding the longitudinal ends to form the girth welds.

The ERW steel pipes used in accordance with aspects of the present invention are, for example, assumed to have tensile characteristics in the pipe longitudinal direction as described below at each circumferential position depending on the pipe formation method (production method). That is, the tensile characteristics at the 0 o'clock cross-sectional position (seam portion) and the 6 o'clock cross-sectional position are high-Y/T low-uEl tensile characteristics with a yield ratio (Y/T) as high as 0.98 and a uniform elongation uEl as low as about 2% after heat treatment (coating and heating). In contrast, the tensile characteristics at each position in an area from the 2 o'clock cross-sectional position to the 4 o'clock cross-sectional position are low-Y/T high-uEl tensile characteristics with Y/T as low as 0.82-0.83 and uEl as high as above 11%. The tensile characteristics at each position in an area from the 8 o'clock cross-sectional position to the 10 o'clock cross-sectional position are also low-Y/T high-uEl tensile characteristics. The 1 o'clock, 5 o'clock, 7 o'clock, and 11 o'clock cross-sectional positions represent transition regions between the above-mentioned positions that are adjacent to each other.

When a long steel pipe produced by joining the above-described ERW steel pipes is spooled onto a reel, the seam of the long steel pipe may be positioned at the reel inner side (intrados). In such a case, since the seam portion has high-Y/T low-uEl tensile characteristics, there is a risk that local buckling of the steel pipe will occur, particularly when adjacent ERW steel pipes are joined together such that the seam positions thereof face each other. In this case, the 6 o'clock cross-sectional position of the long steel pipe is at the reel outer side (extrados). Since the long steel pipe also has high-Y/T low-uEl tensile characteristics at the 6 o'clock cross-sectional position, there is a risk that local fracture will occur in the steel pipe.

Accordingly, the long steel pipe according to aspects of the present invention is formed by successively joining the ERW steel pipes in the pipe longitudinal direction such that the 0 o'clock cross-sectional position (seam) of one of ERW steel pipes adjacent to each other in the pipe longitudinal direction faces an area from the 2 o'clock cross-sectional position to the 4 o'clock cross-sectional position or an area from the 8 o'clock cross-sectional position to the 10 o'clock cross-sectional position of the other of the ERW steel pipes adjacent to each other.

According to aspects of the present invention, when the longitudinal ends of the ERW steel pipes 11 and 12 adjacent to each other are butt-joined together, the longitudinal ends are butted against each other and girth-welded to form girth welds such that the 0 o'clock cross-sectional position, which represents a high-Y/T low-uEl region, of the ERW steel pipe 11 faces the area from the 2 o'clock cross-sectional position to the 4 o'clock cross-sectional position or the area from the 8 o'clock cross-sectional position to the 10 o'clock cross-sectional position, which are low-Y/T high-uEl regions, of each ERW steel pipe 12 adjacent to the ERW steel pipe 11. Accordingly, even when the 0 o'clock cross-sectional position (seam) of the ERW steel pipe 11 is at the reel inner side (intrados) or the reel outer side (extrados) during reel spooling, large axial strains that cause buckling or fracture are not generated. Thus, the long steel pipe 1 has high buckling resistance. Even when the 0 o'clock cross-sectional position (seam) of the ERW steel pipe 11 is at the reel inner side (intrados) or the reel outer side (extrados) during reel spooling, the intrados axial strain (compressive strain) generated in the ERW steel pipe 11 at locations close to the girth welds at the fixed ends has a lower limit of −6.00% or more, and the extrados axial strain (tensile strain) generated in the ERW steel pipe 11 at locations close to the girth welds at the fixed ends has an upper limit of 6.00% or less.

With regard to the buckling resistance, the intrados axial strain (compressive strain) is preferably in the range of −6.00 to −1.00%, more preferably in the range of −5.00% to −1.00%, and still more preferably in the range of −4.00% to −1.00%. When the intrados axial strain (compressive strain) is in the range of −6.00 to −1.00%, the steel pipe is particularly advantageous in that it has high buckling resistance and good reel bending characteristics.

The extrados axial strain (tensile strain) is preferably in the range of 1.00% to 6.00%, more preferably in the range of 1.00% to 5.00%, and still more preferably in the range of 1.00% to 4.00%.

When the extrados axial strain (tensile strain) is in the range of 1.00% to 6.00%, the steel pipe is particularly advantageous in that it has high buckling resistance and good reel bending characteristics.

Case 9 shown in Table 3 is an example of the above-described long steel pipe.

Case 9 is an example in which the long steel pipe 1 is formed by butt-joining the longitudinal ends by girth welding such that the 0 o'clock cross-sectional position (seam) of the ERW steel pipe 11, at which the tensile characteristics are high-Y/T low-uEl tensile characteristics with uEl: 2.00%, YS: 505 MPa, TS: 510 MPa, and Y/T: 0.989, faces the 3 o'clock cross-sectional position of each ERW steel pipe 12 adjacent to the ERW steel pipe 11. Each ERW steel pipe 12 has low-Y/T high-uEl tensile characteristics with uEl: 10.04%, YS: 481 MPa, TS: 585 MPa, and Y/T: 0.822 at the 3 o'clock cross-sectional position.

Figure 8A:
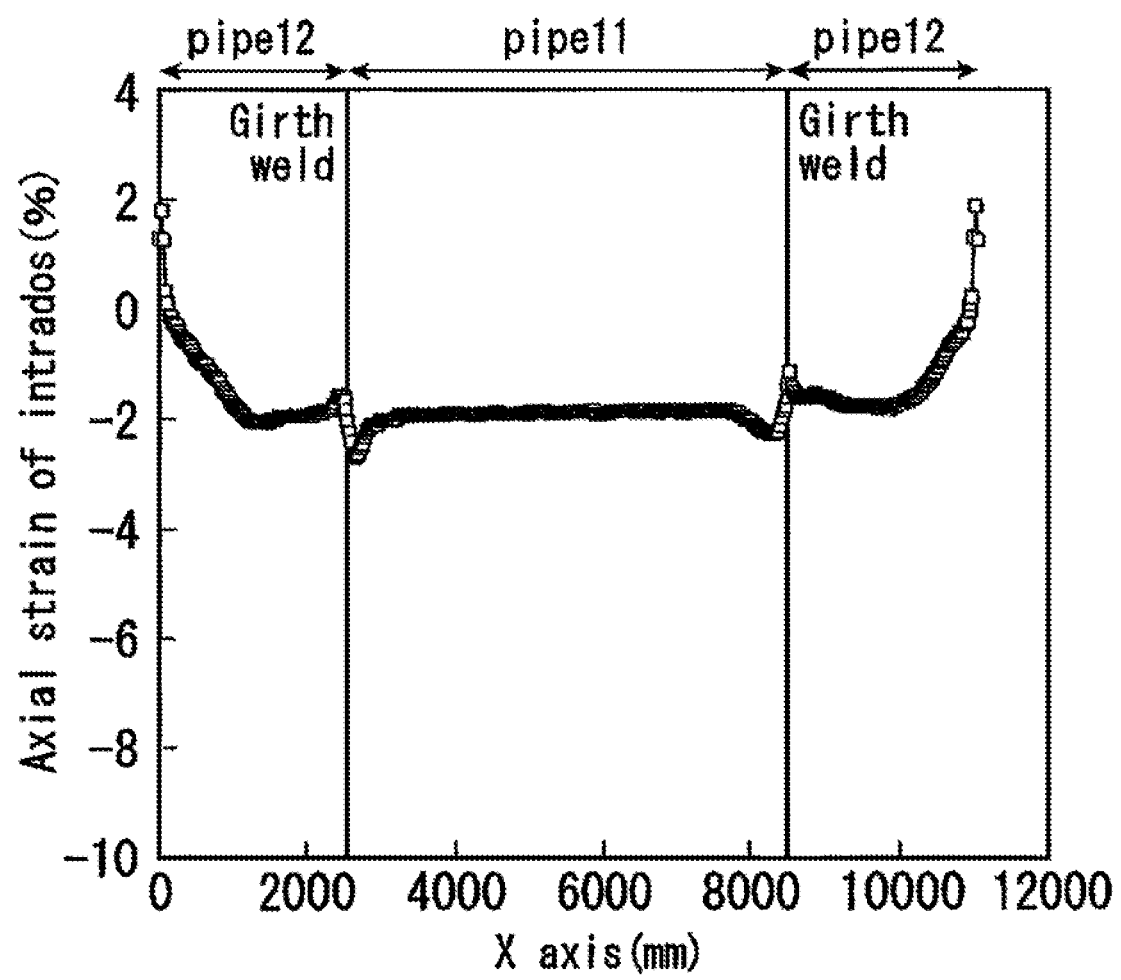
FIG. 8A is a graph showing the distribution of intrados axial strain generated in the long steel pipe when the long steel pipe is bent onto the reel (Case 9).
Figure 8B:
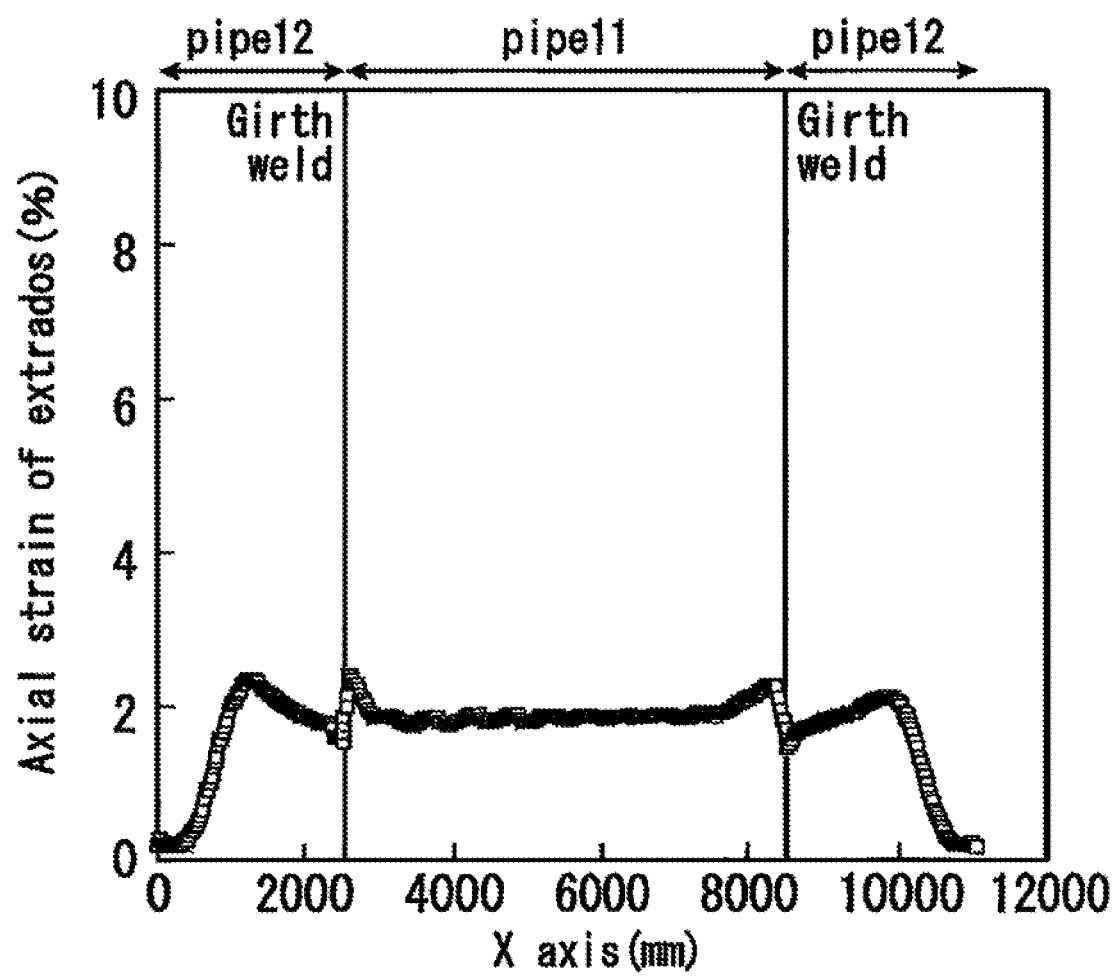
FIG. 8B is a graph showing the distribution of extrados axial strain generated in the long steel pipe when the long steel pipe is bent onto the reel (Case 9).

According to the example of Case 9, even when the 0 o'clock cross-sectional position (seam) of the ERW steel pipe 11, at which the tensile characteristics are high-Y/T low-uEl tensile characteristics, is at the reel inner side (intrados) or the reel outer side (extrados) during reel spooling, the axial strains generated in the ERW steel pipe 11 at locations close to the girth welds at the fixed ends are such that the intrados axial strain is about −3% and the extrados axial strain is about 3%, as shown in FIG. 8. Thus, large axial strains are not generated, and buckling and fracture can be prevented. Thus, the long steel pipe has high buckling resistance.

According to aspects of the present invention, also when the seam portion of the ERW steel pipe 11 is assumed to have high-Y/T low-uEl tensile characteristics with Y/T set to be as high as 1.00 and an extremely low uniform elongation uEl of 0.25%, the ERW steel pipes are joined by girth welding such that the seam position (0 o'clock cross-sectional position) of the ERW steel pipe 11 faces the area from the 2 o'clock cross-sectional position to the 4 o'clock cross-sectional position or the area from the 8 o'clock cross-sectional position to the 10 o'clock cross-sectional position, which are low-Y/T high-uEl regions, of each ERW steel pipe 12 adjacent to the ERW steel pipe 11. Accordingly, even when the seam portion of the ERW steel pipe 11 is at the reel inner side (intrados) or the reel outer side (extrados) during reel spooling, the axial strains generated in the ERW steel pipe 11 at locations close to the girth welds at the fixed ends are small enough to prevent buckling and fracture.

Figure 6A:
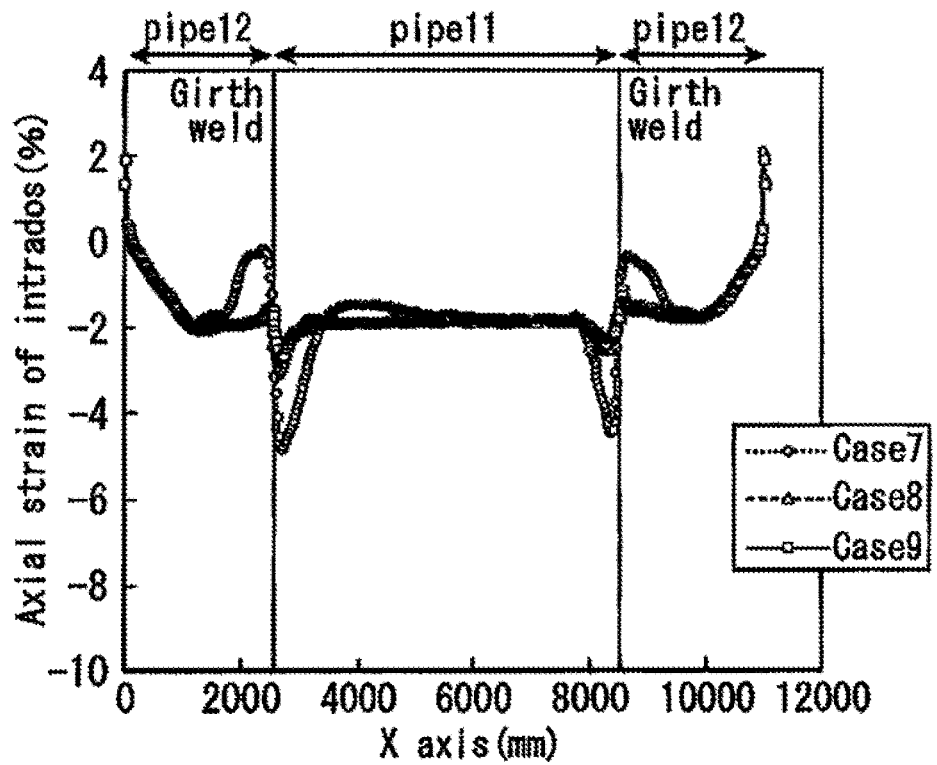
FIG. 6A is a graph showing the distribution of intrados axial strain generated in the long steel pipe when the long steel pipe is bent onto the reel (Case 7 to Case 9).
Figure 6B:
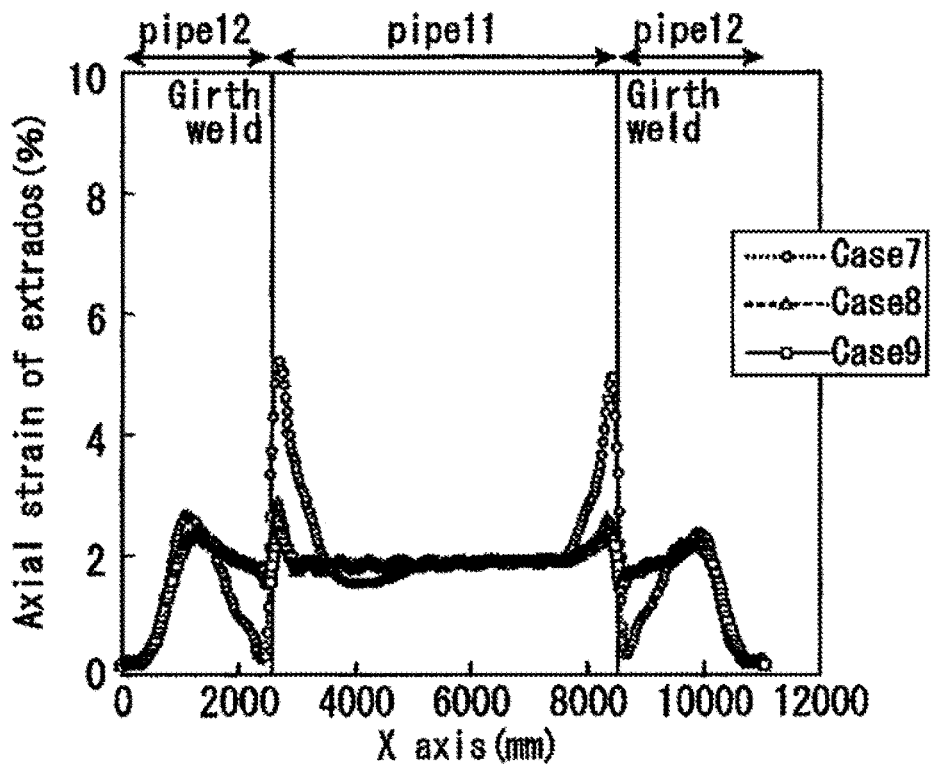
FIG. 6B is a graph showing the distribution of extrados axial strain generated in the long steel pipe when the long steel pipe is bent onto the reel (Case 7 to Case 9).
Figure 6C:
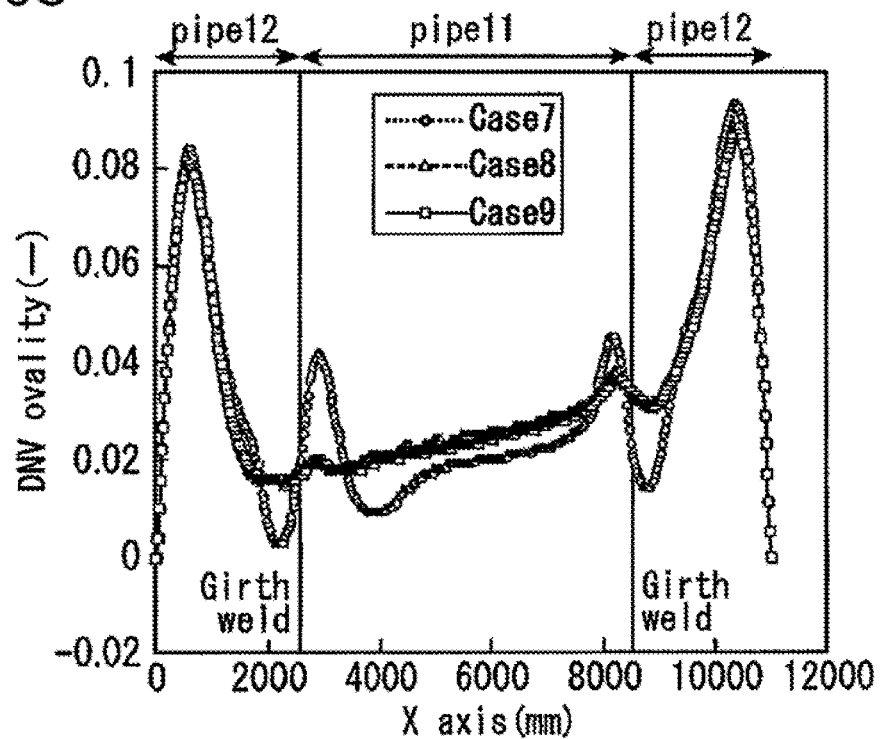
FIG. 6C is a graph showing the distribution of roundness of the long steel pipe when the long steel pipe is bent onto the reel (Case 7 to Case 9).
Figure 7A:
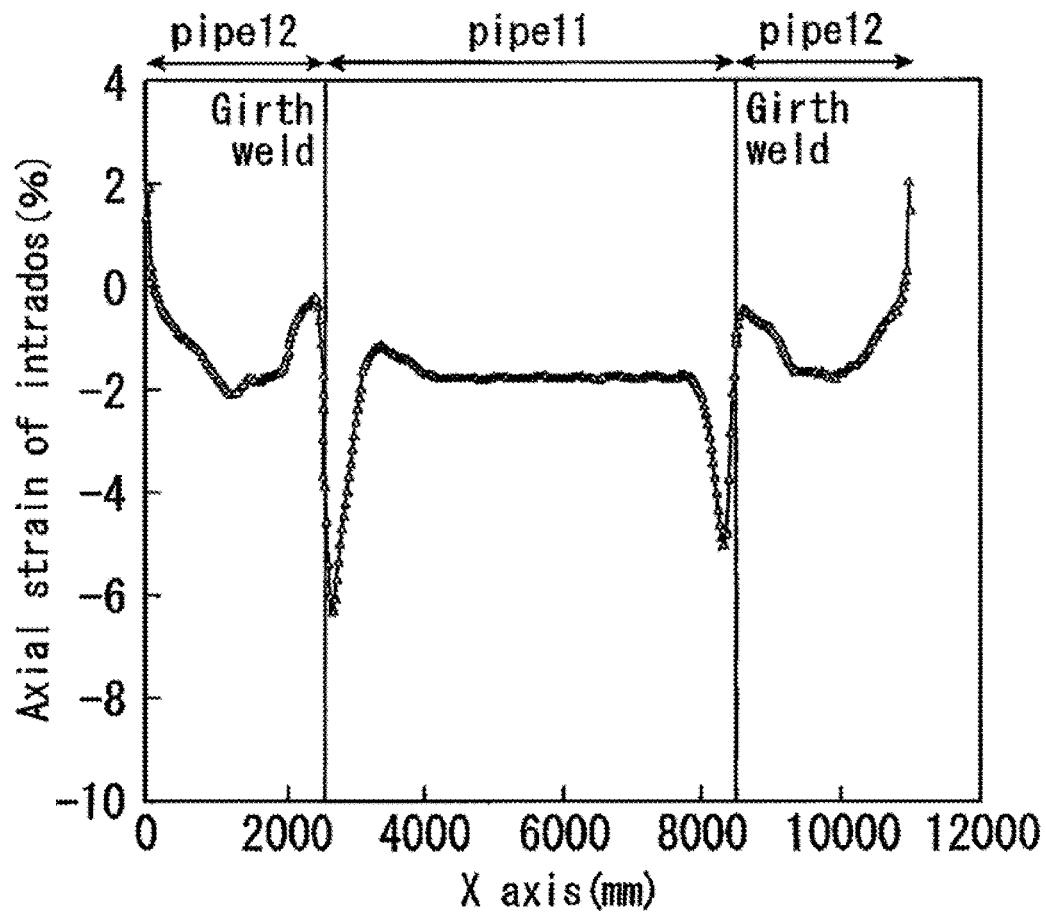
FIG. 7A is a graph showing the distribution of intrados axial strain generated in the long steel pipe when the long steel pipe is bent onto the reel (Case 2).
Figure 7B:
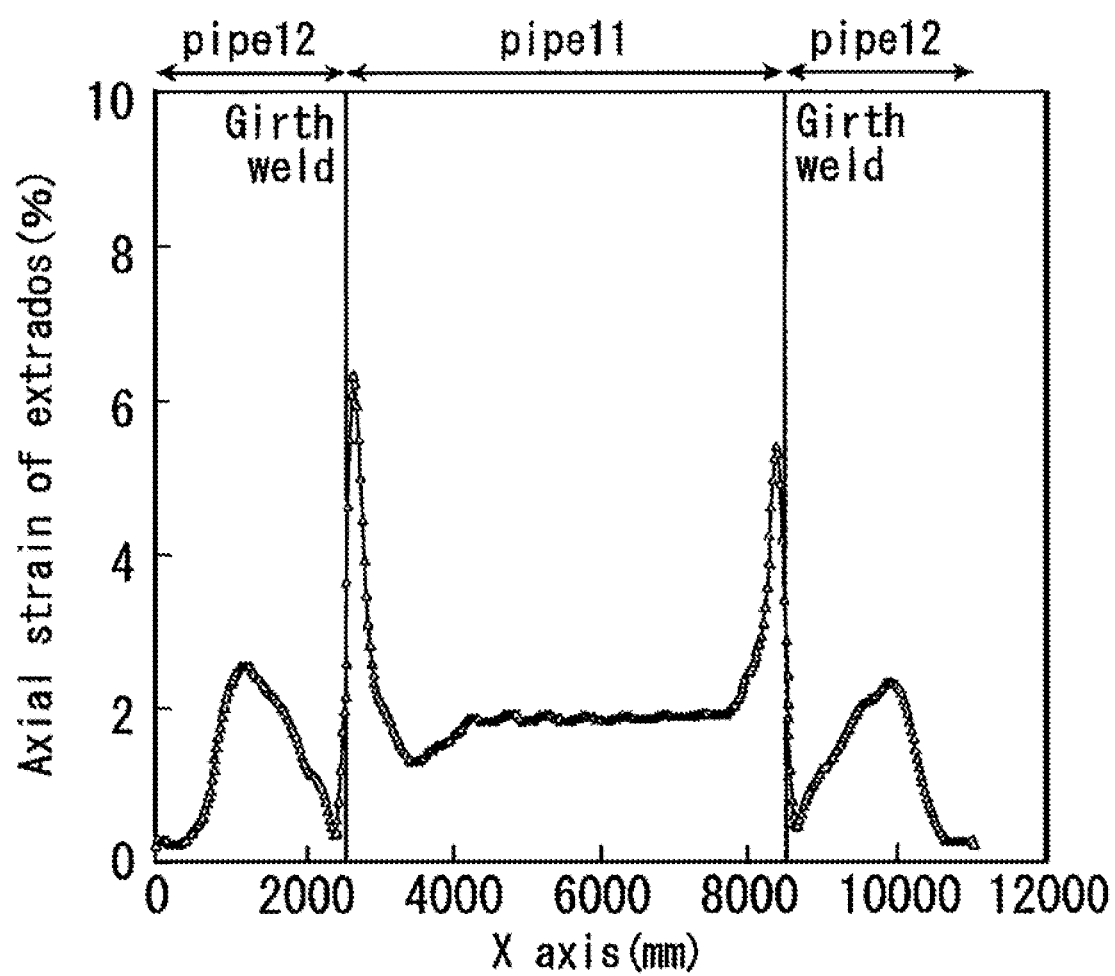
FIG. 7B is a graph showing the distribution of extrados axial strain generated in the long steel pipe when the long steel pipe is bent onto the reel (Case 2).

Case 8 shown in Table 3 is also an example of the above-described long steel pipe. Case 8 is an example in which the long steel pipe 1 is formed by butt-joining the longitudinal ends by girth welding such that the 0 o'clock cross-sectional position (seam) of the ERW steel pipe 11, at which the tensile characteristics are extra-high-Y/T low-uEl tensile characteristics with uEl: 0.25%, YS: 510 MPa, TS: 510 MPa, and Y/T: 1.000, faces the 3 o'clock cross-sectional position of each ERW steel pipe 12 adjacent to the ERW steel pipe 11. Each ERW steel pipe 12 has low-Y/T high-uEl tensile characteristics with uEl: 10.04%, YS: 481 MPa, TS: 585 MPa, and Y/T: 0.822 at the 3 o'clock cross-sectional position. According to the example of Case 8, even when the 0 o'clock cross-sectional position (seam) of the ERW steel pipe 11, at which the tensile characteristics are extra-high-Y/T low-uEl tensile characteristics, is at the reel inner side (intrados) or the reel outer side (extrados) during reel spooling, the axial strains generated in the ERW steel pipe 11 at locations close to the girth welds at the fixed ends are such that the intrados axial strain is about −3% and the extrados axial strain is about 3%, as shown in FIGS. 6A to 6C. Thus, large axial strains are not generated, and buckling and fracture can be prevented. Thus, the long steel pipe has high buckling resistance.

The long steel pipe according to aspects of the present invention may instead be formed by joining the ERW steel pipes by girth welding to form the girth welds such that the 6 o'clock cross-sectional position, which represents the high-Y/T low-uEl region, faces the area from the 2 o'clock cross-sectional position to the 4 o'clock cross-sectional position or the area from the 8 o'clock cross-sectional position to the 10 o'clock cross-sectional position, which are low-Y/T high-uEl regions. Accordingly, even when the 6 o'clock cross-sectional position of the steel pipe is at the reel inner side (intrados) or the reel outer side (extrados) during reel spooling, large axial strains are not generated, and buckling and fracture can be prevented.

The characteristics, outer diameter, wall thickness, etc. of the ERW steel pipes included in the long steel pipe according to aspects of the present invention are not particularly limited. Regular ERW steel pipes having strength and toughness suitable for the environment in which the pipeline is to be installed are, of course, applicable.

The material of the long steel pipe according to aspects of the present invention may be a steel having a composition containing, on a mass percent basis, C: 0.01%-1.00% with the balance being Fe and unavoidable impurities. However, the material is not limited to this.

According to the long steel pipe according to aspects of the present invention, the strengths of adjacent ERW steel pipes are not particularly limited. However, in a case where the adjacent ERW steel pipes have different strengths, when the seam position of the ERW steel pipe 11 having a low strength is at the reel inner side (intrados) or the reel outer side (extrados) during reel spooling, there is a risk that large axial strains will be generated in the ERW steel pipe 11 at locations close to the girth welds at the fixed ends. Therefore, when the adjacent ERW steel pipes have different strengths, it is particularly important to butt-join the longitudinal ends such that the seam position of the ERW steel pipe 11 having a low strength faces the area from the 2 o'clock cross-sectional position to the 4 o'clock cross-sectional position or the area from the 8 o'clock cross-sectional position to the 10 o'clock cross-sectional position of each ERW steel pipe 12 having a high strength.

Figure 4A:
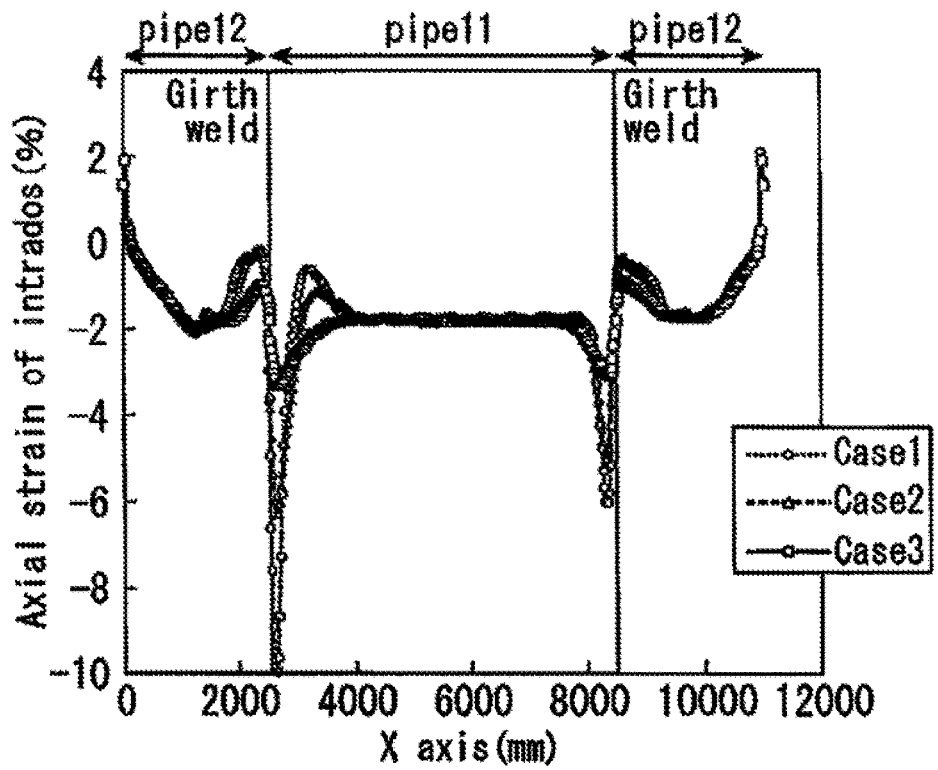
FIG. 4A is a graph showing the distribution of intrados axial strain generated in the long steel pipe when the long steel pipe is bent onto the reel (Case 1 to Case 3).
Figure 4B:
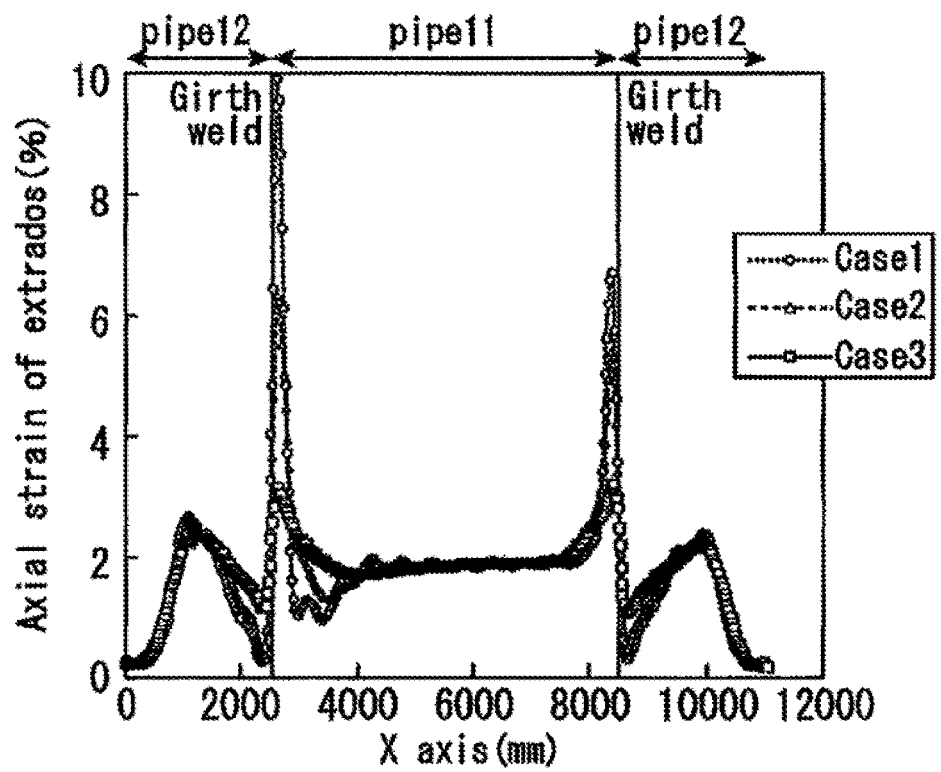
FIG. 4B is a graph showing the distribution of extrados axial strain generated in the long steel pipe when the long steel pipe is bent onto the reel (Case 1 to Case 3).
Figure 4C:
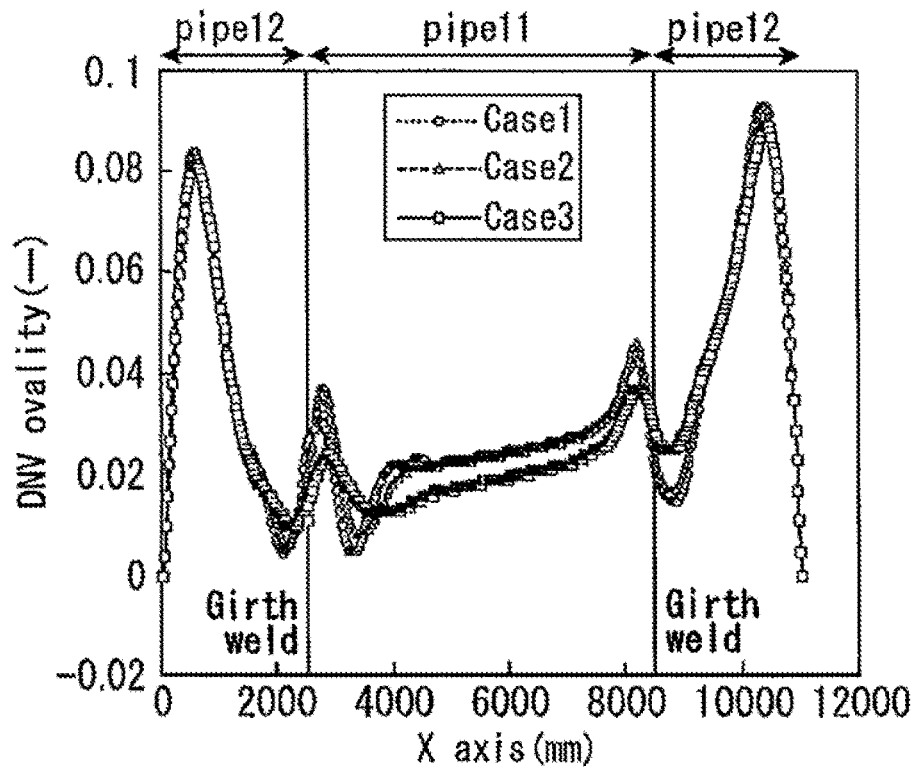
FIG. 4C is a graph showing the distribution of roundness of the long steel pipe when the long steel pipe is bent onto the reel (Case 1 to Case 3).
Figure 5A:
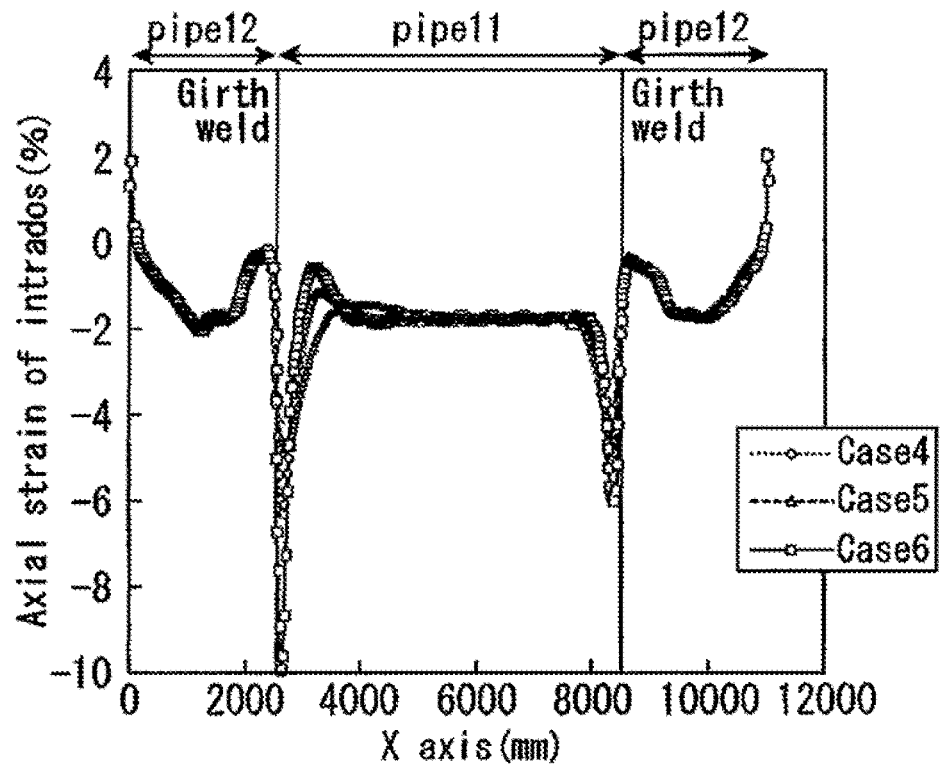
FIG. 5A is a graph showing the distribution of intrados axial strain generated in the long steel pipe when the long steel pipe is bent onto the reel (Case 4 to Case 6).
Figure 5B:
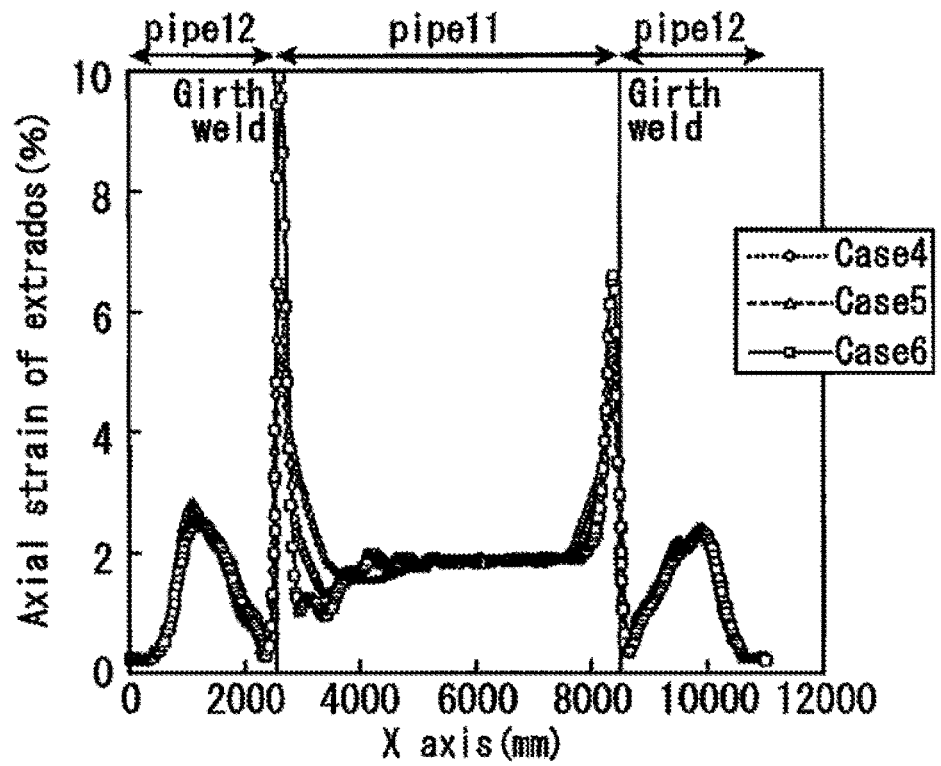
FIG. 5B is a graph showing the distribution of extrados axial strain generated in the long steel pipe when the long steel pipe is bent onto the reel (Case 4 to Case 6).
Figure 5C:
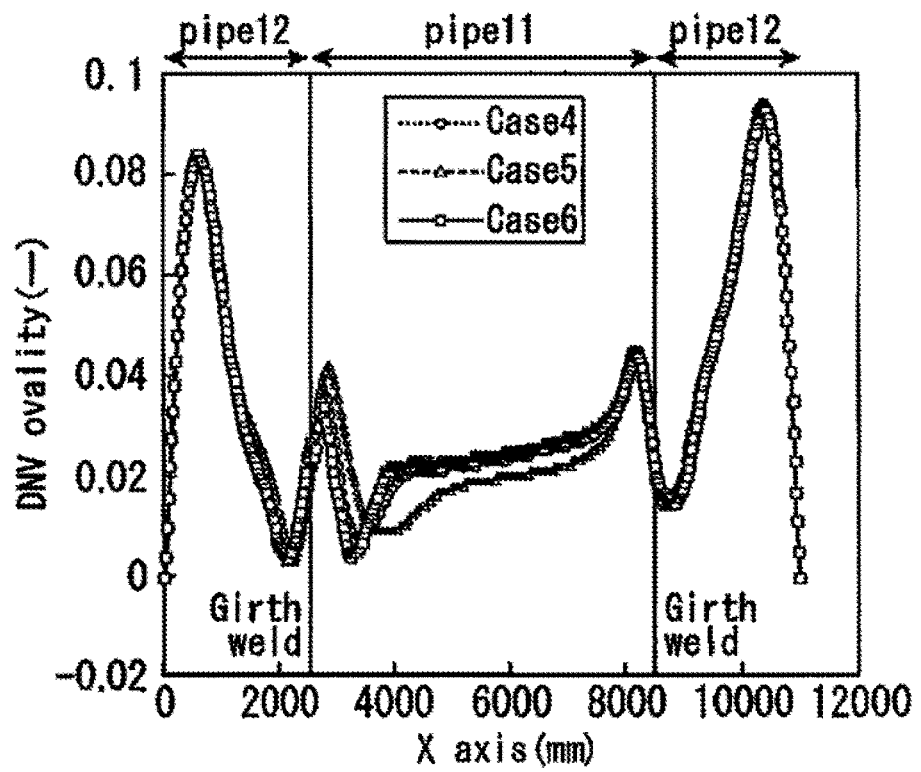
FIG. 5C is a graph showing the distribution of roundness of the long steel pipe when the long steel pipe is bent onto the reel (Case 4 to Case 6).

In the examples shown in FIGS. 4 to 6, the difference in strength (tensile strength TS at the 3 o'clock cross-sectional position) between the ERW steel pipe 11 having a low strength (weak pipe) and the ERW steel pipes 12 having a high strength (strong pipes) is 75 MPa. A similar analysis was performed for a case in which the difference in strength (tensile strength TS at the 3 o'clock cross-sectional position) was 30 MPa, and similar results were obtained. For example, it has been confirmed that when a long steel pipe is obtained by butt-joining longitudinal ends such that a region having high-Y/T low-uEl tensile characteristics with YS: 510 MPa, uEl: 0.27%, Y/T: 1.000, and TS: 510 MPa (seam position) faces a region having high-Y/T low-uEl tensile characteristics with YS: 540 MPa, uEl: 0.28%, Y/T: 1.000, and TS: 540 MPa (seam position) and when the thus-obtained long steel pipe is bent onto a reel, an intrados axial strain generated in the ERW steel pipe having a low strength (weak pipe) at locations close to the girth welds at the fixed ends is about −10%, and there is a risk that buckling will occur.

Thus, particularly when ERW steel pipes having a strength difference of 30 MPa or more are joined together by girth welding to form a long steel pipe, it is important to butt-join the longitudinal ends such that the seam positions of adjacent ERW steel pipes do not face each other. More specifically, it is important to form the long steel pipe by butt-joining the longitudinal ends such that the seam position of the ERW steel pipe (weak pipe) 11 having a low strength faces the area from the 2 o'clock cross-sectional position to the 4 o'clock cross-sectional position of each ERW steel pipe (strong pipe) 12 having a high strength.

The strength difference is preferably in the range of 30 to 100 MPa, more preferably in the range of 30 to 95 MPa, and still more preferably in the range of 30 to 90 MPa. When the strength difference is in the range of 30 to 100 MPa, it is advantageous in that a steel pipe having good reel bending characteristics can be obtained.

With regard to the tensile characteristics of the strong pipe (without treatment after pipe formation) according to aspects of the present invention, the yield strength (YS) is preferably in the range of 289 MPa to 725 MPa, more preferably in the range of 289 MPa to 705 MPa, and still more preferably in the range of 289 MPa to 691 MPa. When the yield strength (YS) is in the range of 289 MPa to 725 MPa, it is particularly advantageous in that a steel pipe having good reel bending characteristics can be obtained.

The tensile strength (TS) is preferably in the range of 413 MPa to 850 MPa, more preferably in the range of 413 MPa to 825 MPa, and still more preferably in the range of 413 MPa to 810 MPa. When the tensile strength (TS) is in the range of 413 MPa to 850 MPa, it is particularly advantageous in that a steel pipe having good reel bending characteristics can be obtained.

In addition, uEL (%) is preferably in the range of 0.29% to 15.2%, more preferably in the range of 0.29% to 13.2%, and still more preferably in the range of 0.29% to 12.1%. When uEL (%) is in the range of 0.29% to 15.2%, it is particularly advantageous in that a steel pipe having good reel bending characteristics can be obtained.

The yield ratio (Y/T) is preferably in the range of 0.822 to 1.000, more preferably in the range of 0.822 to 0.988, and still more preferably in the range of 0.822 to 0.883. When the yield ratio (Y/T) is in the range of 0.822 to 1.000, it is particularly advantageous in that a steel pipe having good reel bending characteristics can be obtained.

With regard to the tensile characteristics of the weak pipe (without treatment after pipe formation) according to aspects of the present invention, the yield strength (YS) is preferably in the range of 289 MPa to 778 MPa, more preferably in the range of 289 MPa to 721 MPa, and still more preferably in the range of 289 MPa to 681 MPa. When the yield strength (YS) is in the range of 289 MPa to 778 MPa, it is particularly advantageous in that a steel pipe having good reel bending characteristics can be obtained.

The tensile strength (TS) is preferably in the range of 413 MPa to 787 MPa, more preferably in the range of 413 MPa to 781 MPa, and still more preferably in the range of 413 MPa to 756 MPa. When the tensile strength (TS) is in the range of 413 MPa to 787 MPa, it is particularly advantageous in that a steel pipe having good reel bending characteristics can be obtained.

In addition, uEL (%) is preferably in the range of 0.25% to 12.6%, more preferably in the range of 0.25% to 11.7%, and still more preferably in the range of 0.25% to 11.5%. When uEL (%) is in the range of 0.25% to 12.6%, it is particularly advantageous in that a steel pipe having good reel bending characteristics can be obtained.

The yield ratio (Y/T) is preferably in the range of 0.82 to 1.000, more preferably in the range of 0.82 to 0.998, and still more preferably in the range of 0.82 to 0.995. When the yield ratio (Y/T) is in the range of 0.82 to 1.000, it is particularly advantageous in that a steel pipe having good reel bending characteristics can be obtained.

An ERW steel pipe according to aspects of the present invention is a steel pipe having a long length including a plurality of ERW steel pipes that are successively joined in the pipe longitudinal direction with girth welds provided therebetween. A preferred method for producing the long steel pipe according to aspects of the present invention will now be described.

First, a plurality of ERW steel pipes of the same dimensions are prepared in accordance with the required length of a long steel pipe to be formed. Then, the longitudinal ends of the prepared ERW steel pipes are successively butted against each other in the pipe longitudinal direction. The longitudinal ends of the ERW steel pipes are butted against each other such that the 0 o'clock cross-sectional position of one of adjacent ERW steel pipes faces an area from the 2 o'clock cross-sectional position to the 4 o'clock cross-sectional position or an area from the 8 o'clock cross-sectional position to the 10 o'clock cross-sectional position of the other of the adjacent ERW steel pipes. Then, the butted longitudinal ends are joined together by girth welding so that a girth weld is formed therebetween. The girth welding method to be used is not particularly limited, and may be a regular welding method, such as manual welding, MAG welding, or submerged arc welding.

The above-described butting and joining processes are repeated to form a long steel pipe of the desired length from the ERW steel pipes. When the ERW steel pipes have difference in strengths, the ERW steel pipes are butt-joined together so that the steel pipes with low strength are disposed between the steel pipes with high strength.

Accordingly, even when the long steel pipe is spooled onto a reel such that the 0 o'clock cross-sectional position (or the 6 o'clock cross-sectional position) is at the reel inner side (intrados) or the reel outer side (extrados), generated axial strains do not reach the axial strains enough to cause local buckling or fracture.

Aspects of the present invention will be further described below based on examples.

EXAMPLES (Tensile Characteristics of ERW Steel Pipes at Each Cross-Sectional Position)

ERW steel pipes (without treatment after pipe formation) having the dimensions (sizes) shown in Table 4 were prepared, and were subjected to a heat treatment (250° C.×1 hr) simulating coating and heating. The ERW steel pipes were selected so that steel pipes having the same dimensions and different tensile strengths were obtained after the heat treatment.

Tensile test pieces (full thickness, GL: 50.8 mm) were extracted from each ERW steel pipe at each of the cross-sectional positions illustrated in FIG. 1 (seam position: 0 o'clock) so that the tensile direction is the pipe longitudinal direction, and a tensile test was performed to determine the tensile characteristics of the ERW steel pipe at each of the cross-sectional positions. Table 4 shows the determined tensile characteristics (yield strength YS (0.5% offset), tensile strength TS, uniform elongation uEl, and yield ratio Y/T) at each of the cross-sectional positions.

TABLE 4

| Test Steel Pipe No. | Steel Pipe Size | | Combination of Steel Pipes Steel Pipe 12 | | | | |
|---|---|---|---|---|---|---|---|
| | Outer Diameter (mm) | Wall Thickness (mm) | Cross-Sectional Position | Tensile Characteristics at Each Position | | | |
| | | | | YS (MPa) | TS (MPa) | uEl (%) | Y/T |
| 1 | 323.9 | 15.9 | 3 o'clock | 458 | 555 | 13.2 | 0.825 |
| 2 | 508.0 | 25.4 | 2 o'clock | 455 | 515 | 15.2 | 0.883 |
| 3 | 406.4 | 15.9 | 3 o'clock | 621 | 720 | 9.8 | 0.863 |
| 4 | 219.1 | 12.7 | 4 o'clock | 522 | 600 | 10.5 | 0.870 |
| 5 | 323.9 | 19.1 | 8 o'clock | 489 | 585 | 11.2 | 0.836 |
| 6 | 273.1 | 15.9 | 10 o'clock | 705 | 825 | 8.8 | 0.855 |
| 7 | 457.2 | 15.9 | 9 o'clock | 510 | 605 | 10.2 | 0.843 |
| 8 | 406.4 | 20.6 | 2 o'clock | 551 | 625 | 10.1 | 0.882 |
| 9 | 508.0 | 20.6 | 3 o'clock | 591 | 705 | 9.6 | 0.838 |
| 10 | 323.9 | 20.6 | 4 o'clock | 522 | 605 | 10.9 | 0.863 |
| 11 | 508.0 | 22.6 | 8 o'clock | 500 | 610 | 9.8 | 0.820 |
| 12 | 273.1 | 12.7 | 9 o'clock | 435 | 505 | 11.3 | 0.861 |
| 13 | 406.4 | 16.9 | 10 o'clock | 485 | 565 | 10.2 | 0.858 |
| 14 | 273.1 | 13.4 | 10 o'clock | 725 | 850 | 7.9 | 0.853 |
| 15 | 508.0 | 22.2 | 8 o'clock | 600 | 685 | 8.9 | 0.876 |
| 16 | 406.4 | 20.6 | 9 o'clock | 520 | 620 | 10.5 | 0.839 |
| 17 | 323.9 | 22.6 | 3 o'clock | 531 | 615 | 12.1 | 0.863 |
| 18 | 323.9 | 11.9 | 10 o'clock | 691 | 810 | 7.9 | 0.853 |
| 19 | 558.8 | 25.4 | 3 o'clock | 505 | 588 | 10.5 | 0.859 |
| 20 | 323.9 | 13.4 | 4 o'clock | 521 | 625 | 11.1 | 0.834 |
| 21 | 323.9 | 15.9 | Seam (0 o'clock) | 545 | 550 | 1.8 | 0.991 |
| 22 | 508.0 | 25.4 | 6 o'clock | 550 | 557 | 1.5 | 0.980 |
| 23 | 219.7 | 12.7 | 1 o'clock | 588 | 590 | 1.6 | 0.997 |
| 24 | 457.2 | 15.9 | 5 o'clock | 581 | 585 | 1.5 | 0.993 |
| 25 | 508.0 | 22.6 | 6 o'clock | 614 | 615 | 1.2 | 0.998 |
| 26 | 323.9 | 20.6 | 7 o'clock | 491 | 500 | 1.2 | 0.982 |
| 27 | 273.1 | 12.7 | 11 o'clock | 511 | 515 | 2.1 | 0.992 |
| 28 | 558.8 | 25.4 | 6 o'clock | 571 | 575 | 1.1 | 0.993 |
| 29 | 406.4 | 16.9 | 7 o'clock | 591 | 600 | 1.2 | 0.985 |
| 30 | 323.9 | 22.6 | 6 o'clock | 600 | 615 | 0.9 | 0.976 |

| Test Steel Pipe No. | Combination of Steel Pipes | | | | | Steel Pipe 12 | |
|---|---|---|---|---|---|---|---|
| | Steel Pipe 11 | | | | | | |
| | Cross-Sectional Position | Tensile Characteristics at Each Position* | | | | Cross-Sectional Position | Tensile Characteristics at Each Position |
| | | YS (MPa) | TS (MPa) | uEl (%) | Y/T | | YS (MPa) |
| 1 | Seam (0 o'clock) | 509 | 510 | 2.0 | 0.998 | 3 o'clock | 458 |
| 2 | Seam (0 o'clock) | 411 | 415 | 1.8 | 0.990 | 2 o'clock | 455 |
| 3 | Seam (0 o'clock) | 681 | 688 | 0.8 | 0.990 | 3 o'clock | 621 |
| 4 | Seam (0 o'clock) | 548 | 555 | 2.1 | 0.987 | 4 o'clock | 522 |
| 5 | 6 o'clock | 535 | 545 | 2.1 | 0.982 | 8 o'clock | 489 |
| 6 | Seam (0 o'clock) | 778 | 787 | 0.6 | 0.989 | 10 o'clock | 705 |
| 7 | Seam (0 o'clock) | 513 | 545 | 2.1 | 0.941 | 9 o'clock | 510 |
| 8 | Seam (0 o'clock) | 570 | 575 | 2.2 | 0.991 | 2 o'clock | 551 |
| 9 | Seam (0 o'clock) | 600 | 610 | 1.6 | 0.984 | 3 o'clock | 591 |
| 10 | Seam (0 o'clock) | 418 | 420 | 2.8 | 0.995 | 4 o'clock | 522 |
| 11 | Seam (0 o'clock) | 555 | 565 | 2.1 | 0.982 | 8 o'clock | 500 |
| 12 | Seam (0 o'clock) | 441 | 455 | 2.5 | 0.969 | 9 o'clock | 435 |
| 13 | Seam (0 o'clock) | 512 | 525 | 1.7 | 0.975 | 10 o'clock | 485 |
| 14 | Seam (0 o'clock) | 778 | 781 | 0.9 | 0.996 | 10 o'clock | 725 |
| 15 | Seam (0 o'clock) | 625 | 635 | 1.1 | 0.984 | 8 o'clock | 600 |
| 16 | Seam (0 o'clock) | 575 | 585 | 1.9 | 0.983 | 9 o'clock | 520 |
| 17 | Seam (0 o'clock) | 545 | 565 | 2.1 | 0.965 | 3 o'clock | 531 |
| 18 | Seam (0 o'clock) | 721 | 756 | 1.1 | 0.954 | 10 o'clock | 691 |
| 19 | Seam (0 o'clock) | 520 | 544 | 2.2 | 0.956 | 3 o'clock | 505 |
| 20 | 6 o'clock | 565 | 580 | 1.8 | 0.974 | 4 o'clock | 521 |
| 21 | Seam (0 o'clock) | 509 | 510 | 2.0 | 0.998 | Seam (0 o'clock) | 545 |
| 22 | Seam (0 o'clock) | 411 | 415 | 1.2 | 0.990 | 6 o'clock | 550 |
| 23 | Seam (0 o'clock) | 548 | 555 | 2.1 | 0.987 | 1 o'clock | 588 |
| 24 | Seam (0 o'clock) | 513 | 545 | 1.9 | 0.941 | 5 o'clock | 581 |
| 25 | Seam (0 o'clock) | 555 | 565 | 2.1 | 0.982 | 6 o'clock | 614 |
| 26 | Seam (0 o'clock) | 418 | 420 | 2.8 | 0.995 | 7 o'clock | 491 |
| 27 | Seam (0 o'clock) | 441 | 455 | 2.5 | 0.969 | 11 o'clock | 511 |
| 28 | Seam (0 o'clock) | 520 | 544 | 2.2 | 0.956 | 6 o'clock | 571 |
| 29 | Seam (0 o'clock) | 512 | 525 | 1.7 | 0.975 | 7 o'clock | 591 |
| 30 | Seam (0 o'clock) | 545 | 565 | 2.1 | 0.965 | 6 o'clock | 600 |

TABLE 4-continued

| Test Steel Pipe No. | Combination of Steel Pipes Steel Pipe 12 Tensile Characteristics at Each Position | | | |
|---|---|---|---|---|
| | TS (MPa) | uEl (%) | Y/T | Note |
| 1 | 555 | 13.2 | 0.825 | Present Invention |
| 2 | 515 | 15.2 | 0.883 | Present Invention |
| 3 | 720 | 9.8 | 0.863 | Present Invention |
| 4 | 600 | 10.5 | 0.870 | Present Invention |
| 5 | 585 | 11.2 | 0.836 | Present Invention |
| 6 | 825 | 8.8 | 0.855 | Present Invention |
| 7 | 605 | 10.2 | 0.843 | Present Invention |
| 8 | 625 | 10.1 | 0.882 | Present Invention |
| 9 | 705 | 9.6 | 0.838 | Present Invention |
| 10 | 605 | 10.9 | 0.863 | Present Invention |
| 11 | 610 | 9.8 | 0.820 | Present Invention |
| 12 | 505 | 11.3 | 0.861 | Present Invention |
| 13 | 565 | 10.2 | 0.858 | Present Invention |
| 14 | 850 | 7.9 | 0.853 | Present Invention |
| 15 | 685 | 8.9 | 0.876 | Present Invention |
| 16 | 620 | 10.5 | 0.839 | Present Invention |
| 17 | 615 | 12.1 | 0.863 | Present Invention |
| 18 | 810 | 7.9 | 0.853 | Present Invention |
| 19 | 588 | 10.5 | 0.859 | Present Invention |
| 20 | 625 | 11.1 | 0.834 | Present Invention |
| 21 | 550 | 1.8 | 0.991 | Comparative Example |
| 22 | 557 | 1.5 | 0.980 | Comparative Example |
| 23 | 590 | 1.6 | 0.997 | Comparative Example |
| 24 | 585 | 1.5 | 0.993 | Comparative Example |
| 25 | 615 | 1.2 | 0.998 | Comparative Example |
| 26 | 500 | 1.2 | 0.982 | Comparative Example |
| 27 | 515 | 2.1 | 0.992 | Comparative Example |
| 28 | 575 | 1.1 | 0.993 | Comparative Example |
| 29 | 600 | 2.1 | 0.985 | Comparative Example |
| 30 | 615 | 0.9 | 0.976 | Comparative Example |

Figures 2A, 2B:
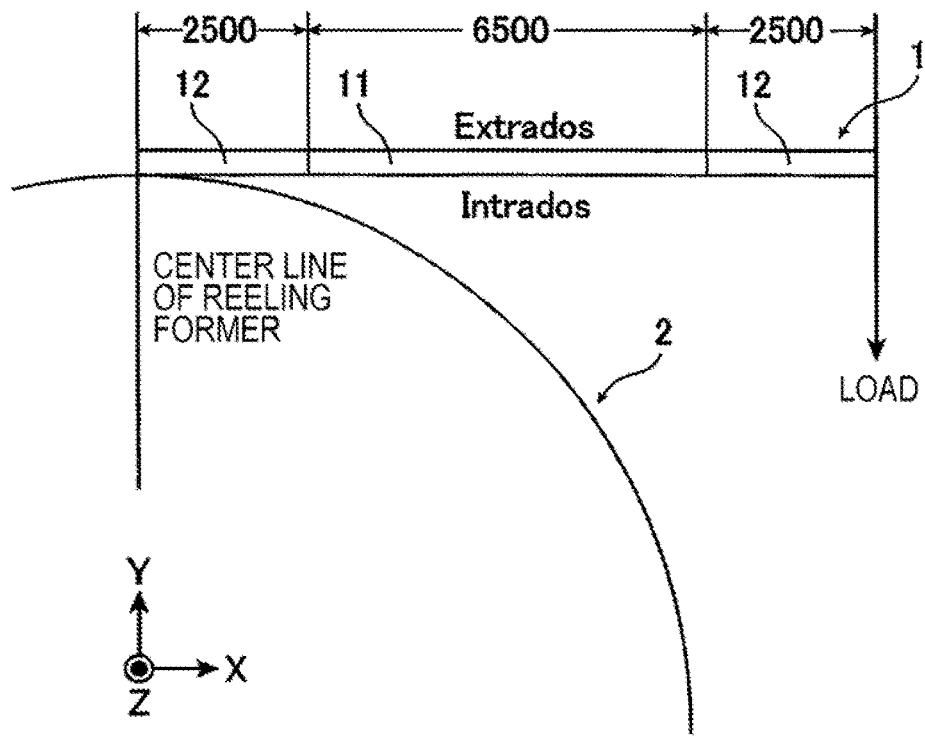
FIG. 2A illustrates an analysis model for analyzing strains generated in a long steel pipe when the long steel pipe is bent onto a reel.
FIG. 2B illustrates the analysis model for analyzing strains generated in the long steel pipe when the long steel pipe is bent onto the reel.
Figure 3A:
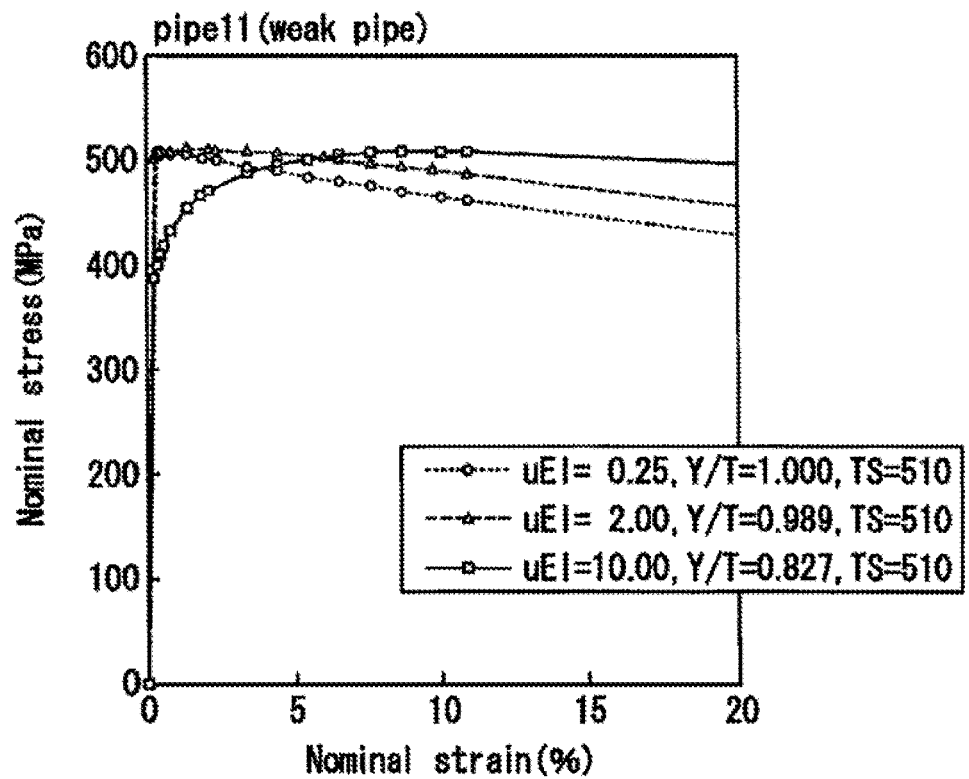
FIG. 3A is a graph showing nominal stress-nominal strain curves used in the analysis.
Figure 3B:
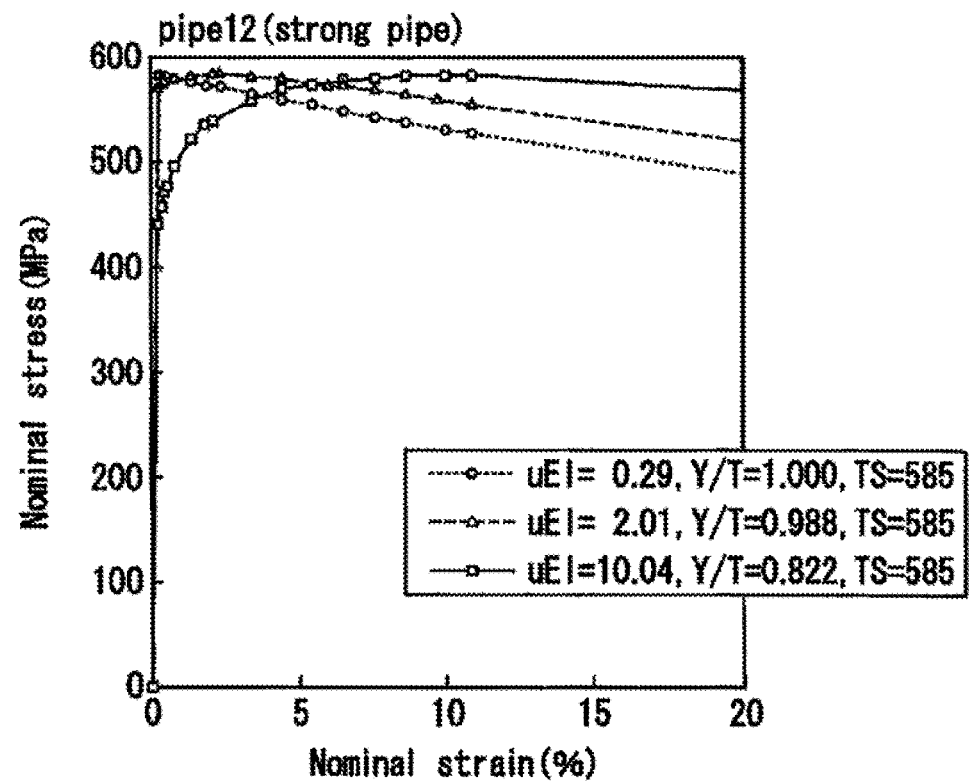
FIG. 3B is a graph showing nominal stress-nominal strain curves used in the analysis.

As illustrated in FIG. 2A, the long steel pipe 1 was produced by joining longitudinal ends of the 2500-mm-long ERW steel pipes 12 to both longitudinal ends of the 6500-mm-long ERW steel pipe 11 by butt girth welding. The girth welding was performed by the MAG welding method. The 2500-mm-long ERW steel pipes 12 were steel pipes (strong pipes) having a strength greater than that of the 6500-mm-long ERW steel pipe 11. The 6500-mm-long ERW steel pipe 11 is referred to as a weak pipe. Referring to Table 4, the longitudinal ends were butted against each other such that the seam position (0 o'clock cross-sectional position) or the 6 o'clock cross-sectional position of the ERW steel pipe (weak pipe) 11 faces different cross-sectional positions of the ERW steel pipes (strong pipes) 12.

Referring to FIG. 2A, the obtained long steel pipe 1 was assumed to be bent onto the reeling former (radius: 8250 mm) 2 to a final position shown in FIG. 2B by applying a load thereto. A strain in the pipe longitudinal direction (axial direction) generated at the inner side (intrados) of the long steel pipe 1 was analyzed by a finite element method. The analysis was carried out on the assumption that the 0 o'clock position (seam) or the 6 o'clock cross-sectional position of the ERW steel pipe 11 (weak pipe) was at the inner side (intrados). The analysis by the finite element method was performed by using nominal stress-nominal strain curves represented by uEl, YS, TS, and Y/T after heat treatment (250° C.×1 h) simulating coating and heating shown in Table 4 as the tensile characteristics of the ERW steel pipes 11 and 12 at each cross-sectional position. The nominal stress-nominal strain curves were created by using the Swift equation. The nominal stress-nominal strain curves for the girth welds were set to overmatch the nominal stress-nominal strain curves for the ERW steel pipes 12.

The results are shown in Table 5.

TABLE 5

| Test Steel Pipe No. | Axial Strain in Steel Pipe 11 at Locations Close to Girth Welds at Fixed Ends Intrados Axial Strain (%) | Note |
|---|---|---|
| 1 | −2.02 | Present Invention |
| 2 | −2.98 | Present Invention |
| 3 | −2.41 | Present Invention |
| 4 | −1.62 | Present Invention |
| 5 | −2.01 | Present Invention |
| 6 | −1.68 | Present Invention |
| 7 | −2.81 | Present Invention |
| 8 | −2.51 | Present Invention |
| 9 | −3.01 | Present Invention |
| 10 | −2.01 | Present Invention |
| 11 | −3.22 | Present Invention |
| 12 | −1.72 | Present Invention |
| 13 | −2.63 | Present Invention |
| 14 | −1.73 | Present Invention |
| 15 | −3.13 | Present Invention |
| 16 | −2.54 | Present Invention |
| 17 | −1.93 | Present Invention |
| 18 | −1.93 | Present Invention |
| 19 | −3.33 | Present Invention |

TABLE 5-continued

| Test Steel Pipe No. | Axial Strain in Steel Pipe 11 at Locations Close to Girth Welds at Fixed Ends Intrados Axial Strain (%) | Note |
|---|---|---|
| 20 | −1.93 | Present Invention |
| 21 | −9.99 | Comparative Example |
| 22 | −10.90 | Comparative Example |
| 23 | −9.87 | Comparative Example |
| 24 | −9.77 | Comparative Example |
| 25 | −9.22 | Comparative Example |
| 26 | −9.81 | Comparative Example |
| 27 | −9.65 | Comparative Example |
| 28 | −9.77 | Comparative Example |
| 29 | −9.98 | Comparative Example |
| 30 | −9.51 | Comparative Example |

The examples of the present invention (test steel pipes No. 1 to No. 20) are cases (long steel pipes) in which end surfaces in the pipe longitudinal direction are butt-joined together by girth welding such that the seam position (0 o'clock cross-sectional position) or the 6 o'clock cross-sectional position of the steel pipe (weak pipe) 11 having high-Y/T low-uEl tensile characteristics faces an area from the 2 o'clock cross-sectional position to the 4 o'clock cross-sectional position or an area from the 8 o'clock cross-sectional position to the 10 o'clock cross-sectional position of each steel pipe (strong pipe) 12 having low-Y/T high-uEl tensile characteristics.

The comparative examples (test steel pipes No. 21 to No. 30) are cases (long steel pipes) in which end surfaces in the pipe longitudinal direction are butt-joined together by girth welding such that the seam position (0 o'clock cross-sectional position) of the steel pipe (weak pipe) 11 having high-Y/T low-uEl tensile characteristics faces one of the 0 o'clock, 1 o'clock, 5 o'clock, 7 o'clock, and 11 o'clock cross-sectional positions of each steel pipe (strong pipe) 12 having high-Y/T low-uEl tensile characteristics.

According to the examples of the present invention, the axial strain (intrados axial strain) generated in the steel pipe 11 at locations close to the girth welds at the fixed ends is −1.62% (test steel pipe No. 4) to −3.33% (test steel pipe No. 19). In each case, the compressive axial strain (intrados axial strain) does not reach −6% which is in a region with a risk of buckling. Therefore, it can be said that the examples of the present invention are long steel pipes having high buckling resistance.

In contrast, according to the comparative examples (test steel pipes No. 21 to No. 30) that are outside the scope of the present invention, the compressive axial strain (intrados axial strain) generated in the steel pipe 11 at locations close to the girth welds at the fixed ends is −9.22 (test steel pipe No. 25) to −10.90 (test steel pipe No. 22). Thus, the compressive strain exceeds −6%, and there is a risk of buckling. It cannot be said that the comparative examples that are outside the scope of the present invention are long steel pipes having high buckling resistance.

INDUSTRIAL APPLICABILITY

According to aspects of the present invention, a long steel pipe for reel-lay installation formed of ERW steel pipes and having high buckling resistance can be easily produced without using any special facility or performing any special heat treatment. In particular, aspects of the present invention are capable of providing a long steel pipe for reel-lay installation and a method for producing the long steel pipe for reel-lay installation with which, even when a position on an ERW steel pipe at which Y/T is high and uEl is low (0 o'clock cross-sectional position (position of seam portion) or 6 o'clock cross-sectional position) is at the reel inner side (intrados) or the reel outer side (extrados) during reel spooling, generated axial strains are small and the risk of buckling or fracture is low.

REFERENCE SIGNS LIST 1 long steel pipe
2 reeling former (reel)
11 steel pipe (weak pipe)
12 steel pipe (strong pipe)

The invention claimed is:

1. A long steel pipe for reel-lay installation comprising a plurality of electric resistance welded steel pipes joined in a pipe longitudinal direction with a girth weld provided therebetween, wherein the plurality of electric resistance welded steel pipes include adjacent electric resistance welded steel pipes that are adjacent to each other, a seam position of one of the adjacent electric resistance welded steel pipes being defined as a 0 o'clock cross-sectional position and positions that evenly divide a pipe cross section of other of the adjacent electric resistance welded steel pipes into 12 sections around a pipe axis being defined as the 0 o'clock cross-sectional position to an 11 o'clock cross-sectional position in a clockwise order, and wherein the plurality of electric resistance welded steel pipes are joined such that the 0 o'clock cross-sectional position of the one of the adjacent electric resistance welded steel pipes faces an area from the 2 o'clock cross-sectional position to the 4 o'clock cross-sectional position or an area from the 8 o'clock cross-sectional position to the 10 o'clock cross-sectional position of the other of the adjacent electric resistance welded steel pipes.

2. A long steel pipe for reel-lay installation comprising a plurality of electric resistance welded steel pipes joined in a pipe longitudinal direction with a girth weld provided therebetween, wherein the plurality of electric resistance welded steel pipes include adjacent electric resistance welded steel pipes that are adjacent to each other, a seam position of one of the adjacent electric resistance welded steel pipes being defined as a 0 o'clock cross-sectional position and positions that evenly divide a pipe cross section of other of the adjacent electric resistance welded steel pipes into 12 sections around a pipe axis being defined as the 0 o'clock cross-sectional position to an 11 o'clock cross-sectional position in a clockwise order, and wherein the plurality of electric resistance welded steel pipes are joined such that the 6 o'clock cross-sectional position of the one of the adjacent electric resistance welded steel pipes faces an area from the 2 o'clock cross-sectional position to the 4 o'clock cross-sectional position or an area from the 8 o'clock cross-sectional position to the 10 o'clock cross-sectional position of the other of the adjacent electric resistance welded steel pipes.

3. The long steel pipe for reel-lay installation according to claim 1, wherein one of the adjacent electric resistance welded steel pipes has a tensile strength in a range of 413 MPa to 787 MPa, and other of the adjacent electric resistance welded steel pipes has a tensile strength in a range of 413 MPa to 850 MPa.

4. The long steel pipe for reel-lay installation according to claim 3, wherein a tensile strength of the other of the adjacent electric resistance welded steel pipes at the 3 o'clock cross-sectional position is higher than a tensile strength of the one of the adjacent electric resistance welded steel pipes at the 3 o'clock cross-sectional position by 30 MPa or more.

5. A method for producing the long steel pipe for reel-lay installation according to claim 1 as a steel pipe having a long length, the method comprising:
successively joining longitudinal ends of a plurality of electric resistance welded steel pipes by butt girth welding,
wherein a seam position of each electric resistance welded steel pipe is defined as a 0 o'clock cross-sectional position,
wherein positions that evenly divide a pipe cross section of each electric resistance welded steel pipe into 12 sections around a pipe axis are defined as the 0 o'clock cross-sectional position to an 11 o'clock cross-sectional position in a clockwise order, and
wherein the butt girth welding is performed while the longitudinal ends of adjacent electric resistance welded steel pipes are butted against each other such that the 0 o'clock cross-sectional position of one of the adjacent electric resistance welded steel pipes faces an area from the 2 o'clock cross-sectional position to the 4 o'clock cross-sectional position or an area from the 8 o'clock cross-sectional position to the 10 o'clock cross-sectional position of other of the adjacent electric resistance welded steel pipes.

6. A method for producing the long steel pipe for reel-lay installation according to claim 2 as a steel pipe having a long length, the method comprising:
successively joining longitudinal ends of a plurality of electric resistance welded steel pipes by butt girth welding,
wherein a seam position of each electric resistance welded steel pipe is defined as a 0 o'clock cross-sectional position,
wherein positions that evenly divide a pipe cross section of each electric resistance welded steel pipe into 12 sections around a pipe axis are defined as the 0 o'clock cross-sectional position to an 11 o'clock cross-sectional position in a clockwise order, and
wherein the butt girth welding is performed while the longitudinal ends of adjacent electric resistance welded steel pipes are butted against each other such that the 6 o'clock cross-sectional position of one of the adjacent electric resistance welded steel pipes faces an area from the 2 o'clock cross-sectional position to the 4 o'clock cross-sectional position or an area from the 8 o'clock cross-sectional position to the 10 o'clock cross-sectional position of other of the adjacent electric resistance welded steel pipes.

7. The method for producing the long steel pipe for reel-lay installation according to claim 5, wherein one of the adjacent electric resistance welded steel pipes has a tensile strength in a range of 413 MPa to 787 MPa, and other of the adjacent electric resistance welded steel pipes has a tensile strength in a range of 413 MPa to 850 MPa.

8. The method for producing the long steel pipe for reel-lay installation according to claim 7, wherein a tensile strength of the other of the adjacent electric resistance welded steel pipes at the 3 o'clock cross-sectional position is higher than a tensile strength of the one of the adjacent electric resistance welded steel pipes at the 3 o'clock cross-sectional position by 30 MPa or more.

9. The long steel pipe for reel-lay installation according to claim 2, wherein one of the adjacent electric resistance welded steel pipes has a tensile strength in a range of 413 MPa to 787 MPa, and other of the adjacent electric resistance welded steel pipes has a tensile strength in a range of 413 MPa to 850 MPa.

10. The long steel pipe for reel-lay installation according to claim 9, wherein a tensile strength of the other of the adjacent electric resistance welded steel pipes at the 3 o'clock cross-sectional position is higher than a tensile strength of the one of the adjacent electric resistance welded steel pipes at the 3 o'clock cross-sectional position by 30 MPa or more.

11. The method for producing the long steel pipe for reel-lay installation according to claim 6, wherein one of the adjacent electric resistance welded steel pipes has a tensile strength in a range of 413 MPa to 787 MPa, and other of the adjacent electric resistance welded steel pipes has a tensile strength in a range of 413 MPa to 850 MPa.

12. The method for producing the long steel pipe for reel-lay installation according to claim 11, wherein a tensile strength of the other of the adjacent electric resistance welded steel pipes at the 3 o'clock cross-sectional position is higher than a tensile strength of the one of the adjacent electric resistance welded steel pipes at the 3 o'clock cross-sectional position by 30 MPa or more.

\* \* \* \* \*